(12) United States Patent
Hegge

(10) Patent No.: US 8,433,330 B2
(45) Date of Patent: Apr. 30, 2013

(54) BASE STATION APPARATUS AND IDENTIFIER ASSIGNMENT METHOD

(75) Inventor: Stephan Hegge, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 140 days.

(21) Appl. No.: 13/022,955

(22) Filed: Feb. 8, 2011

(65) Prior Publication Data

US 2011/0207466 A1   Aug. 25, 2011

(30) Foreign Application Priority Data

Feb. 25, 2010   (JP) ................................. 2010-040605

(51) Int. Cl.
*H04W 72/00*   (2009.01)

(52) U.S. Cl.
USPC ..................... 455/450; 455/452.1; 455/452.2; 455/455; 370/329; 370/342; 370/350

(58) Field of Classification Search ................... 455/450
See application file for complete search history.

(56) References Cited

U.S. PATENT DOCUMENTS

| 2010/0113051 | A1* | 5/2010 | Du et al. ........................ 455/450 |
| 2010/0113081 | A1 | 5/2010 | Ishii et al. |
| 2010/0169436 | A1* | 7/2010 | Graham et al. ............... 709/206 |
| 2010/0195636 | A1* | 8/2010 | Nakashima et al. .......... 370/342 |
| 2010/0240377 | A1* | 9/2010 | De Pasquale et al. ........ 455/445 |
| 2011/0134862 | A1* | 6/2011 | Huang et al. .................. 370/329 |

FOREIGN PATENT DOCUMENTS

JP   2008-219852 A   9/2008

\* cited by examiner

*Primary Examiner* — Kiet Doan
*Assistant Examiner* — Mazda Sabouri
(74) *Attorney, Agent, or Firm* — Fujitsu Patent Center

(57) ABSTRACT

A terminal information acquiring unit acquires terminal information on the priority of a terminal device that requests the assignment of a preamble to a base station apparatus. A priority determining unit determines whether the priority of the terminal device is not less than a predetermined reference on the basis of the terminal information acquired by the terminal information acquiring unit. A preamble assigning unit refers to the determination result reported from the priority determining unit and assigns a preamble to the terminal device when the priority of the terminal device is not less than the predetermined reference. The preamble assigning unit then outputs assignment information indicating the assigned preamble to a transmitting unit. The transmitting unit transmits the assignment information output from the preamble assigning unit.

14 Claims, 20 Drawing Sheets

| QCI | RESOURCE TYPE | PRIORITY SEQUENCE | ALLOWABLE DELAY | ALLOWABLE LOSS RATIO |
|---|---|---|---|---|
| 1 | GBR | 2 | 100 ms | $10^{-2}$ |
| 2 | | 4 | 150 ms | $10^{-3}$ |
| 3 | | 3 | 50 ms | $10^{-3}$ |
| 4 | | 5 | 300 ms | $10^{-6}$ |
| 5 | Non-GBR | 1 | 100 ms | $10^{-6}$ |
| 6 | | 6 | 300 ms | $10^{-6}$ |
| 7 | | 7 | 100 ms | $10^{-3}$ |
| 8 | | 8 | 300 ms | $10^{-6}$ |
| 9 | | 9 | | |

BASE STATION APPARATUS AND IDENTIFIER ASSIGNMENT METHOD

CROSS-REFERENCE TO RELATED APPLICATION

This application is based upon and claims the benefit of priority of the prior Japanese Patent Application No. 2010-040605, filed on Feb. 25, 2010, the entire contents of which are incorporated herein by reference.

FIELD

The embodiments discussed herein are directed to a base station apparatus and an identifier assignment method.

BACKGROUND

In general, in a wireless communication system that uses a terminal device such as a cell phone, the terminal device can access a base station apparatus by using an access method called a random access when the terminal device starts to communicate with the base station apparatus. In the case of a random access, the terminal device transmits an identifier called a preamble to the base station apparatus by using a random access channel (RACH) to establish synchronization between the terminal device and the base station apparatus.

The random access includes two kinds of random accesses of a terminal device-led random access and a network-led random access in which the network includes a base station apparatus. In a terminal device-led random access, a terminal device randomly selects one preamble from a utilizable preamble group that is previously defined and transmits the selected preamble to a base station apparatus. Therefore, a plurality of terminal devices may transmit the same preamble at the same timing in some cases to cause conflict between terminal device-led random accesses. For this reason, a terminal device-led random access is also referred to as a contention based random access. Because a process for canceling a conflict is required when the conflict occurs, the terminal device-led random access causes delayed synchronization establishment between the terminal device and the base station apparatus.

On the other hand, in the case of a network-led random access, a terminal device previously requests a base station apparatus to assign a preamble and transmits the preamble assigned by the base station apparatus to the base station apparatus. Therefore, because the conflict of a preamble transmitted by the terminal device is not caused, a network-led random access is also referred to as a non-contention based random access.

Although a wireless communication system can employ only one of a contention based random access and a non-contention based random access, the wireless communication system can also combine both random accesses to realize a random access. In other words, a part of an utilizable preamble group can be used as a preamble for a contention based random access and the rest can be used as a preamble for a non-contention based random access. Such a random access is realized, for example, when a terminal device performs a handover or when the synchronization establishment of an uplink from a terminal device to a base station apparatus is required. This technique has been known as disclosed in, for example, Japanese Laid-open Patent Publication No. 2008-219852.

As described above, a non-contention based random access can prevent the delay of synchronization establishment between a terminal device and a base station apparatus without causing the conflict of a preamble. However, because a non-contention based random access restricts the number of preambles that can be assigned to terminal devices by each base station apparatus, there is a problem in that a preamble is short when many terminal devices request the assignment of a preamble. In other words, when a preamble is once assigned to a terminal device, this preamble is occupied by the terminal device for dozens of milliseconds to several seconds and thus can not be used by other terminal devices. Therefore, when the number of terminal devices that execute a non-contention based random access around the same time increases, a preamble cannot be assigned to a part of the terminal devices.

Particularly, in the case of a combined random access of a contention based random access and a non-contention based random access, a preamble for a non-contention based random access may be short when the assignment of a preamble is performed in the order by which the assignment request of a preamble arrives at a base station apparatus. A terminal device to which a preamble for a non-contention based random access is not assigned due to the shortage of a preamble performs a contention based random access. At this time, for example, when a preamble for a non-contention based random access is not assigned to a terminal device that requires a constant QoS (Quality of Service), the required QoS may not be achieved. In other words, there is a problem in that a required bandwidth is not secured for a terminal device that requires QoS higher than another terminal device.

It is specifically explained about the problem with reference to FIG. 22. In FIG. 22, preambles #1 to #16 are preambles for a non-contention based random access and preambles #17 to #64 are preambles for a contention based random access. Moreover, terminal devices indicated by a slant line in the diagram are guaranteed bit-rate QoS terminal devices and terminal devices indicated by a white space in the diagram are best-effort QoS terminal devices. In other words, terminal devices indicated by a slant line in the diagram require QoS higher than terminal devices indicated by a white space in the drawing.

In FIG. 22, preambles are assigned to terminal devices that request the assignment of a preamble on a first-come-first-served basis. For this reason, when the preambles #1 to #16 are all assigned, even a QoS terminal device of which the bandwidth is assured should perform a contention based random access by using any of the preambles #17 to #64 after the assignment. According to a contention based random access, because the conflict of a preamble selected by a terminal device may occur, a communication start between the terminal device and the base station apparatus is delayed. As a result, a bandwidth balanced with the QoS of the terminal device cannot be assured.

SUMMARY

According to an aspect of an embodiment of the invention, a base station apparatus includes an acquiring unit that acquires terminal information indicating a priority of a terminal device for which synchronization is not established between the base station apparatus and the terminal device; a determining unit that determines whether the priority of the terminal device is not less than a predetermined reference on the basis of the terminal information acquired by the acquiring unit; an assigning unit that assigns, when the priority of the terminal device is not less than the predetermined reference as a result of the determination performed by the determining unit, an identifier used for synchronization establishment using a random access to the terminal device; and a transmitting unit that transmits assignment information including the identifier assigned by the assigning unit.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENT(S)

Preferred embodiments of the present invention will be explained with reference to accompanying drawings. The present invention is not limited to the embodiments explained below.

[a] First Embodiment

Figure 1:
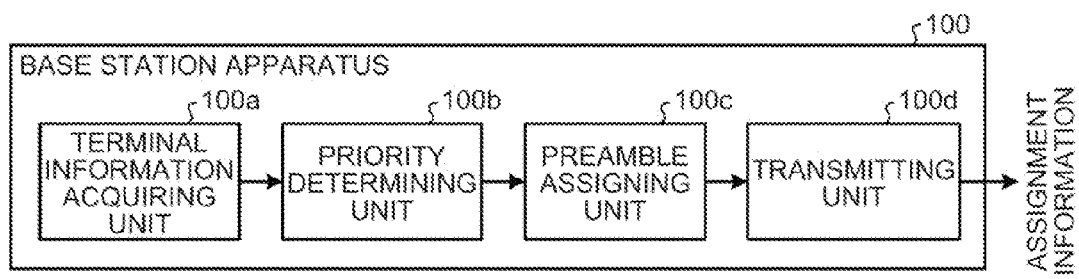
FIG. 1 is a block diagram illustrating the configuration of a base station apparatus according to a first embodiment.

FIG. 1 is a block diagram illustrating the configuration of a base station apparatus 100 according to the first embodiment. The base station apparatus 100 illustrated in FIG. 1 includes a terminal information acquiring unit 100a, a priority determining unit 100b, a preamble assigning unit 100c, and a transmitting unit 100d.

The terminal information acquiring unit 100a acquires information (hereinafter, "terminal information") on a priority of a terminal device (not illustrated) that requests the assignment of a preamble to the base station apparatus 100. Then, the terminal information acquiring unit 100a outputs the acquired terminal information to the priority determining unit 100b.

The priority determining unit 100b determines whether the priority of the not-illustrated terminal device is not less than a predetermined reference on the basis of the terminal information output from the terminal information acquiring unit 100a. In other words, the priority determining unit 100b determines the priority of the not-illustrated terminal device, for example, by using the comparison of threshold values. Then, the priority determining unit 100b informs the preamble assigning unit 100c of the determination result of a priority.

The preamble assigning unit 100c refers to the determination result reported from the priority determining unit 100b and assigns a preamble to the not-illustrated terminal device when the priority of the terminal device is not less than the predetermined reference. The preamble assigning unit 100c then outputs assignment information indicative of the assigned preamble to the transmitting unit 100d. Moreover, the preamble assigning unit 100c does not assign a preamble to the not-illustrated terminal device when the priority of the terminal device is less than the predetermined reference.

The transmitting unit 100d transmits the assignment information output from the preamble assigning unit 100c. Specifically, the transmitting unit 100d directly transmits the assignment information to the not-illustrated terminal device or transmits the assignment information to the not-illustrated terminal device via another base station apparatus that is not illustrated.

Next, it will be explained about an operation of the base station apparatus 100 that is constituted as described above. It will be below explained about an operation of the base station apparatus 100 when the not-illustrated terminal device requests the assignment of a preamble to execute a non-contention based random access.

When the assignment of a preamble is requested from the not-illustrated terminal device, the terminal information acquiring unit 100a acquires terminal information of the terminal device. The acquired terminal information is output to the priority determining unit 100b and is compared with a predetermined reference. As a result, a priority of the not-illustrated terminal device is determined.

Then, when the priority of the not-illustrated terminal device is not less than the predetermined reference, the preamble assigning unit 100c assigns a preamble to the terminal device and the transmitting unit 100d transmits assignment information. On the other hand, when the priority of the not-illustrated terminal device is less than the predetermined reference, a preamble is not assigned to the terminal device.

As a result, a terminal device of which the priority is not less than a predetermined reference receives the assignment information transmitted from the transmitting unit 100d and transmits the assigned preamble to the base station apparatus 100 to execute a non-contention based random access. For this reason, a terminal device having a high priority can achieve a required QoS without executing a contention based random access by which a communication start may be delayed. On the contrary, because a preamble is not assigned to a terminal device of which the priority is less than a predetermined reference, the terminal device transmits the randomly selected preamble to the base station apparatus 100 to execute a contention based random access.

As described above, according to the present embodiment, the base station apparatus determines the priority of the terminal device from the terminal information of the terminal device that requests the assignment of a preamble and assigns a preamble when the priority is not less than the predetermined reference. For this reason, a terminal device that requires a comparatively high QoS can preferentially execute a non-contention based random access and thus can prevent the delay of a communication start performed by a terminal device of which the bandwidth is assured to achieve a required QoS.

[b] Second Embodiment

In the second embodiment, the presence or absence of the assignment of a preamble to a terminal device is determined by a priority sequence corresponding to QCI (QoS Class Identifier) that is defined by 3GPP (3rd Generation Partnership Project).

Figure 2:
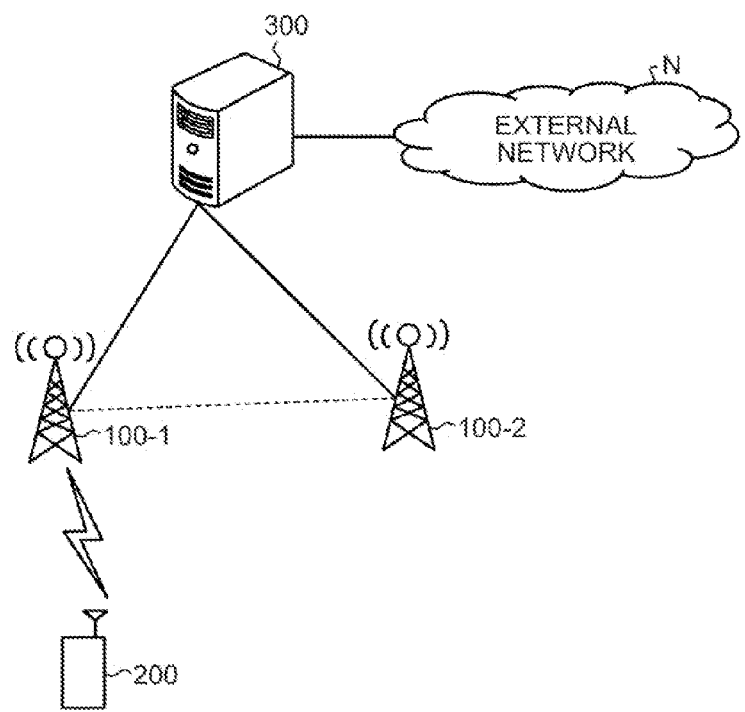
FIG. 2 is a diagram illustrating an example of a network configuration according to a second embodiment.

FIG. 2 is a diagram illustrating an example of a network configuration according to the second embodiment. As illustrated in FIG. 2, a base station apparatus 100-1 and a terminal device 200 perform wireless communication. The base station apparatus 100-1, a base station apparatus 100-2, and a control station device 300 are connected to each other in a wired manner. Moreover, the control station device 300 is connected to an external network N. When a handover for changing a communications partner from the base station apparatus 100-1 to the base station apparatus 100-2 is performed, the terminal device 200 executes a random access to establish synchronization with the base station apparatus 100-2.

The base station apparatus 100-1 decides to make the terminal device 200 perform a handover in accordance with a wireless communication situation between itself and the terminal device 200. Then, the base station apparatus 100-1 transmits the terminal information of the terminal device 200 to the base station apparatus 100-2 that is a handover destination.

The base station apparatus 100-2 determines whether the device itself receives the handover of the terminal device 200 in consideration of a margin such as a wireless resource. Then, when receiving the handover, the base station apparatus 100-2 determines the priority of the terminal device 200 on the basis of the terminal information received from the base station apparatus 100-1 and decides the presence or absence of the assignment of a preamble. When assigning a preamble, the base station apparatus 100-2 secures the assigned preamble for the sake of the terminal device 200 and transmits assignment information to the terminal device 200 via the base station apparatus 100-1.

The terminal device 200 receives the assignment information from the base station apparatus 100-1 and transmits the preamble included in the assignment information to the base station apparatus 100-2. As a result, the terminal device 200 establishes synchronization between itself and the base station apparatus 100-2 and completes the handover.

The control station device 300 is connected to the base station apparatuss 100-1 and 100-2, for example, by using an S1 interface and controls the exchange of data between the base station apparatuss 100-1 and 100-2 and the external network N and the exchange of data between the base station apparatuss 100-1 and 100-2. Moreover, a base station apparatus other than the base station apparatuss 100-1 and 100-2 may be connected to the control station device 300. Moreover, as illustrated with a broken line in FIG. 2, the base station apparatuss 100-1 and 100-2 may be directly connected to each other, for example, by using an X2 interface.

Figure 3:
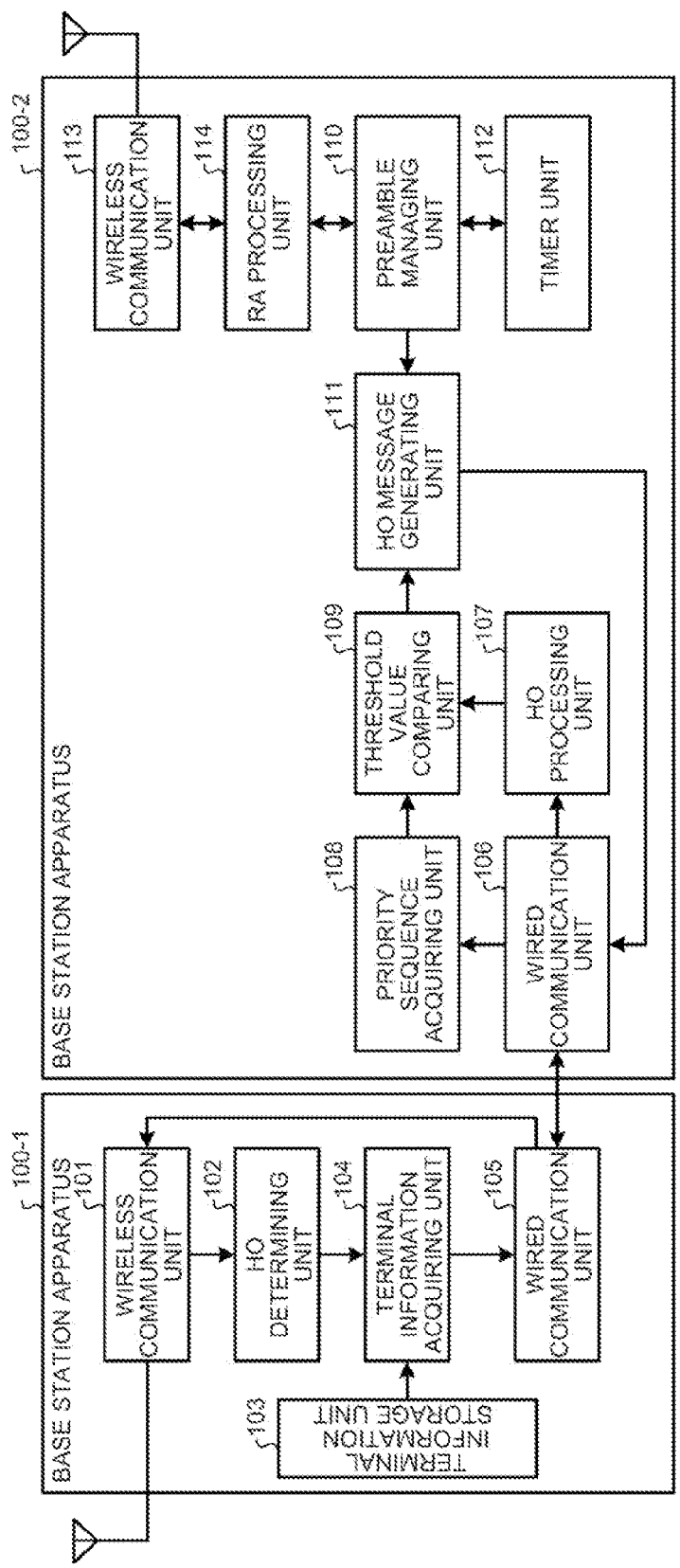
FIG. 3 is a block diagram illustrating the configuration of a base station apparatus according to the second embodiment.

FIG. 3 is a block diagram illustrating the configuration of the base station apparatuss 100-1 and 100-2 according to the second embodiment. In FIG. 3, the configurations of the base station apparatuss 100-1 and 100-2 are different for convenience of explanation. Actually, the two base station apparatuss 100-1 and 100-2 may have the same configuration.

The base station apparatus 100-1 includes a wireless communication unit 101, a handover determining unit (hereinafter, "an HO determining unit") 102, a terminal information storage unit 103, a terminal information acquiring unit 104, and a wired communication unit 105.

The wireless communication unit 101 wirelessly communicates with the terminal device 200 via an antenna. Specifically, the wireless communication unit 101 receives, via the antenna, a signal including information, such as the measurement result of signal strength of the terminal device 200, for deciding the presence or absence of a handover. Moreover, the wireless communication unit 101 transmits a handover message (hereinafter, "an HO message") output from the wired communication unit 105 to the terminal device 200 via the antenna. The HO message includes information indicating the presence or absence of the handover of the terminal device 200 and information designating an assigned preamble when the preamble is assigned to the terminal device 200.

The HO determining unit 102 determines whether it makes the terminal device 200 perform a handover on the basis of the received signal including the measurement result of the signal strength of the terminal device 200. Specifically, for example, when the signal strength between the base station apparatus 100-1 and the terminal device 200 is not more than a predetermined level and the signal strength between the base station apparatus 100-2 and the terminal device 200 is not less than the predetermined level, the HO determining unit 102 determines that it makes the terminal device 200 perform a handover. Then, when it is determined that it makes the terminal device 200 perform a handover, the HO determining unit 102 informs the terminal information acquiring unit 104 of that effect.

Figures 4, 5:
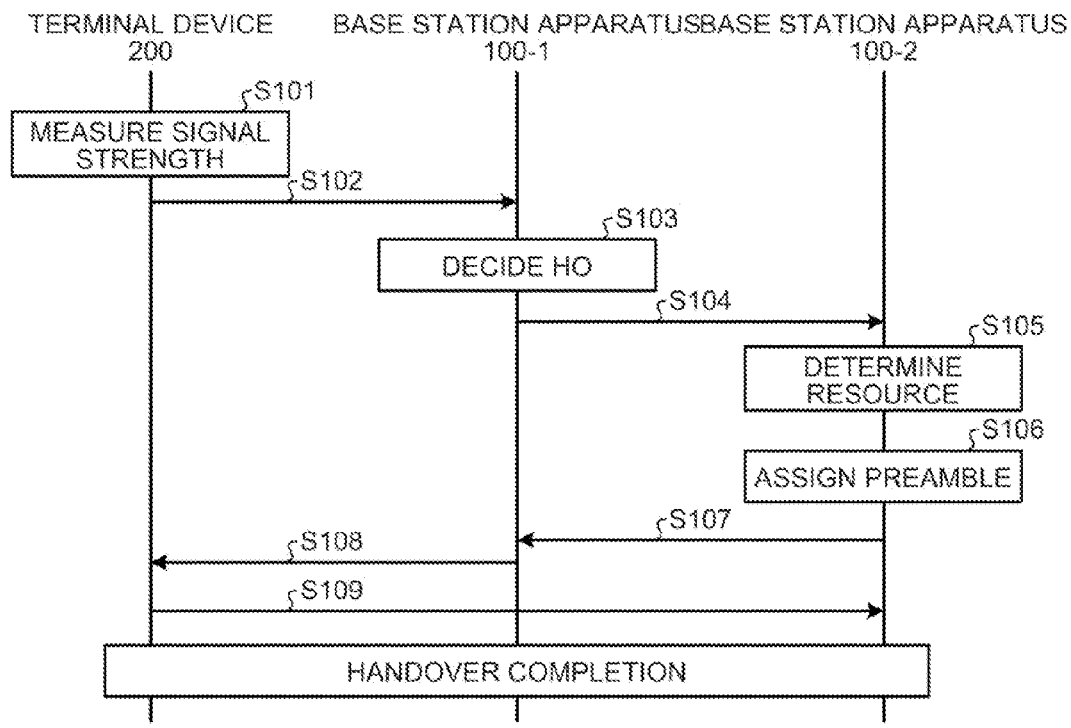
FIG. 4 is a diagram illustrating a specific example of terminal information.
FIG. 5 is a sequence diagram illustrating a handover procedure according to the second embodiment.

The terminal information storage unit 103 stores therein the terminal information of terminal devices in a network including the terminal device 200. Specifically, the terminal information storage unit 103 stores, for example, QCI that is an index value of communication quality set for connection established by each terminal device as the terminal information of the terminal device. In other words, because a plurality of connections is usually established between a terminal device and a base station apparatus and each connection has different transmission data, each connection has different required QoS. Therefore, the terminal information storage unit 103 stores therein QCIs for all connections established by each terminal device in association with the terminal device. For example, as illustrated in FIG. 4, QCI indicates QoS of each connection with respect to a plurality of items. In other words, QCI corresponds to, for example, the resource type, priority sequence, allowable delay, and allowable loss ratio of connection.

For example, a connection of which is QCI is "1" is a "GBR" (Guaranteed Bit Rate) connection of which the resource type is a bandwidth-guaranteed type, has a second high priority sequence, and has the allowable delay of "100 ms" and the allowable loss ratio of "$10^{-2}$". Moreover, a connection of which QCI is "5" is a "Non-GBR" connection of which the resource type is not a bandwidth-guaranteed type, has a first high priority sequence, and has the allowable delay of "100 ms" and the allowable loss ratio of "$10^{-6}$". The terminal information storage unit 103 stores QCIs of all connections established by a terminal device as terminal information for each terminal device of the network.

When the effect that it makes the terminal device 200 perform a handover is reported from the HO determining unit 102, the terminal information acquiring unit 104 acquires the terminal information of the terminal device 200 from the terminal information storage unit 103. In other words, the terminal information acquiring unit 104 acquires QCIs of all connections stored in association with the terminal device 200 from the terminal information storage unit 103.

The wired communication unit 105 transmits the request of a handover and the terminal information of the terminal device 200 acquired by the terminal information acquiring unit 104 to the base station apparatus 100-2. Moreover, the wired communication unit 105 receives an HO message from the base station apparatus 100-2 and outputs the HO message to the wireless communication unit 101. Moreover, the wired communication unit 105 may be connected to the base station apparatus 100-2 via the control station device 300 by using the S1 interface or may be directly connected to the base station apparatus 100-2 by using the X2 interface.

On the other hand, the base station apparatus 100-2 includes a wired communication unit 106, a handover processing unit (hereinafter, "an HO processing unit") 107, a priority sequence acquiring unit 108, a threshold value comparing unit 109, a preamble managing unit 110, an HO message generating unit 111, a timer unit 112, a wireless communication unit 113, and a random access processing unit (hereinafter, "an RA processing unit") 114.

The wired communication unit 106 receives the request of a handover and the terminal information of the terminal device 200 transmitted from the base station apparatus 100-1. Moreover, the wired communication unit 106 transmits an HO message generated by the HO message generating unit 111 to the base station apparatus 100-1. Moreover, similarly to the wired communication unit 105, the wired communication unit 106 may be connected to the base station apparatus 100-1 via the control station device 300 by using the S1 interface or may be directly connected to the base station apparatus 100-1 by using the X2 interface.

When the request of a handover is received by the wired communication unit 106, the HO processing unit 107 determines whether the handover of the terminal device 200 is permitted in consideration of a margin or the like of a wireless resource. In other words, for example, when the number of terminal devices that already wirelessly communicate with the base station apparatus 100-2 is less than a predetermined number and the base station apparatus 100-2 has a sufficient wireless resource, the HO processing unit 107 permits the handover of the terminal device 200. Then, the HO processing unit 107 informs the threshold value comparing unit 109 of the advisability of a handover.

The priority sequence acquiring unit 108 acquires the highest priority sequence from the terminal information received by the wired communication unit 106. In other words, as described above, because the terminal information includes QCIs of the plurality of connections established by the terminal device 200, priority sequences respectively correspond to the plurality of QCIs. Therefore, the priority sequence acquiring unit 108 acquires the highest priority sequence from the priority sequences corresponding to the QCIs. For example, when the wired communication unit 106 receives the QCIs of "1", "3", and "6" among the QCIs illustrated in FIG. 4 as terminal information, the priority sequence acquiring unit 108 acquires the priority sequence "2" corresponding to the QCI "1".

When the handover of the terminal device 200 is permitted by the HO processing unit 107, the threshold value comparing unit 109 compares the priority sequence acquired by the priority sequence acquiring unit 108 and a predetermined threshold value. Then, when the priority sequence is higher than a predetermined order and the value of the priority sequence is less than the predetermined threshold value, the threshold value comparing unit 109 determines to assign a preamble to the terminal device 200. On the other hand, when the priority sequence is lower than the predetermined order and the value of the priority sequence is not less than the predetermined threshold value, the threshold value comparing unit 109 determines not to assign a preamble to the terminal device 200. Moreover, when the handover of the terminal device 200 is not permitted by the HO processing unit 107, the threshold value comparing unit 109 informs the HO message generating unit 111 of the effect of handover rejection without performing threshold comparison on a priority sequence.

The preamble managing unit 110 stores therein a preamble group that can be used for a random access to the base station apparatus 100-2 and manages the assignment situation of each preamble to a terminal device. In other words, the preamble managing unit 110 stores the effect that the preamble is an already-assigned preamble when a preamble is assigned to a terminal device by the HO message generating unit 111. Moreover, the preamble managing unit 110 releases a preamble that is used for synchronization establishment of the RA processing unit 114 and a preamble of which the corresponding timer of the timer unit 112 expires and stores the effect that the preambles are not assigned.

When it is determined that a preamble is assigned to the terminal device 200 as a result of the comparison performed by the threshold value comparing unit 109, the HO message generating unit 111 refers to the assignment situation of the preamble managing unit 110 and assigns a not-assigned preamble to the terminal device 200. Then, the HO message generating unit 111 generates an HO message that includes the effect that the handover of the terminal device 200 is permitted and the assignment information of a preamble to be assigned to the terminal device 200. Moreover, when it is determined that a preamble is not assigned to the terminal device 200 as the result of the comparison performed by the threshold value comparing unit 109, the HO message generating unit 111 generates an HO message that includes the effect that a handover is permitted even if a preamble is not assigned to the terminal device 200. Moreover, when the handover of the terminal device 200 is not permitted, the HO message generating unit 111 generates an HO message that indicates that effect.

The timer unit 112 includes a timer corresponding to each preamble that is managed by the preamble managing unit 110. When a preamble is assigned to a terminal device by the HO message generating unit 111, the timer unit 112 starts the corresponding timer. Then, when the timer expires, the timer unit 112 instructs the preamble managing unit 110 to release the corresponding preamble.

The wireless communication unit 113 wirelessly communicates with the terminal device 200 via an antenna. Specifically, the wireless communication unit 113 receives a preamble transmitted from the terminal device 200 via the antenna and outputs the preamble to the RA processing unit 114. Moreover, when the handover is completed by the synchronization establishment according to a random access process, the wireless communication unit 113 transmits and receives a signal to and from the terminal device 200 via the antenna.

The RA processing unit 114 performs the random access process by using the preamble output from the wireless communication unit 113 and establishes synchronization with the terminal device 200. Then, the RA processing unit 114 informs the preamble managing unit 110 of the effect that the use of the preamble used for synchronization establishment is completed.

Now, it will be explained about a handover procedure of the terminal device 200 with reference to FIG. 5. FIG. 5 is a sequence diagram illustrating a handover procedure when the terminal device 200 performs a handover from the base station apparatus 100-1 to the base station apparatus 100-2.

In an initial state, the base station apparatus 100-1 and the terminal device 200 perform wireless communication. The terminal device 200 measures a signal strength between itself and the base station apparatus 100-1 and measures a signal strength between itself and the peripheral base station apparatus 100-2 (Step S101). Then, the terminal device 200 reports the measured signal strength to the base station apparatus 100-1 (Step S102). The signal strength is an index indicating whether the terminal device 200 should perform a handover. Therefore, when the signal strength is received by the wireless communication unit 101 of the base station apparatus 100-1, the HO determining unit 102 determines whether the handover of the terminal device 200 is performed. In this case, it is continuously explained about the case where the signal strength between the terminal device and the base station apparatus 100-2 is higher than the signal strength between the terminal device and the base station apparatus 100-1 and thus it is determined that the handover of the terminal device 200 should be performed (Step S103).

When it is determined by the HO determining unit 102 that the handover should be performed, the terminal information acquiring unit 104 acquires QCIs of all connections established by the terminal device 200 from the terminal information storage unit 103 as terminal information. The acquired terminal information and the request of a handover are transmitted to the base station apparatus 100-2 by the wired communication unit 105 (Step S104).

Then, the request of a handover and the terminal information are received by the wired communication unit 106 of the base station apparatus 100-2 and the highest priority sequence is acquired by the priority sequence acquiring unit 108 from the QCIs included in the terminal information. The acquired value of the priority sequence is output to the threshold value comparing unit 109. On the other hand, the HO processing unit 107 determines a margin or the like of a wireless resource (Step S105) and decides whether the handover of the terminal device 200 is permitted. In this case, it is continuously explained about the case where the number of terminal devices that wirelessly communicate with the base station apparatus 100-2 is less than a predetermined number and thus the handover of the terminal device 200 is permitted.

When the handover is permitted by the HO processing unit 107, the threshold value comparing unit 109 compares the value of the priority sequence output from the priority sequence acquiring unit 108 and a predetermined threshold value. Then, when the priority sequence is higher than a predetermined order, it is decided to assign a preamble to the terminal device 200 because this means that at least one connection having a high priority exists among connections established by the terminal device 200. On the other hand, when the priority sequence is low than the predetermined order, it is decided not to assign a preamble to the terminal device 200. Hereinafter, it is continuously explained about the case where the priority sequence is higher than the predetermined order.

When it is determined by the threshold value comparing unit 109 that a preamble is assigned to the terminal device 200, the HO message generating unit 111 assigns a not-assigned preamble determined by the preamble managing unit 110 to the terminal device 200 (Step S106). Then, the HO message generating unit 111 generates an HO message that includes the assignment information on the assigned preamble and the effect that a handover is permitted and transmits the HO message from the wired communication unit 106 to the base station apparatus 100-1 (Step S107). Moreover, at the same time as the assignment of the preamble to the terminal device 200, the preamble managing unit 110 stores that the preamble assigned to the terminal device 200 is an already-assigned preamble and starts a timer of the timer unit 112 corresponding to the preamble. In other words, until the timer of the timer unit 112 expires, the use of the preamble is reserved by the terminal device 200 and thus the preamble is not assigned to another terminal device.

The HO message transmitted from the wired communication unit 106 is transferred to the terminal device 200 via the wired communication unit 105 and the wireless communication unit 101 of the base station apparatus 100-1 (Step S108). Because the received HO message includes a preamble, the terminal device 200 transmits the preamble to the base station apparatus 100-2 by using RACH (Step S109). As a result, the base station apparatus 100-2 performs a random access process that is performed by the RA processing unit 114, establishes synchronization between itself and the terminal device 200, and completes the handover of the terminal device 200.

Figure 6:
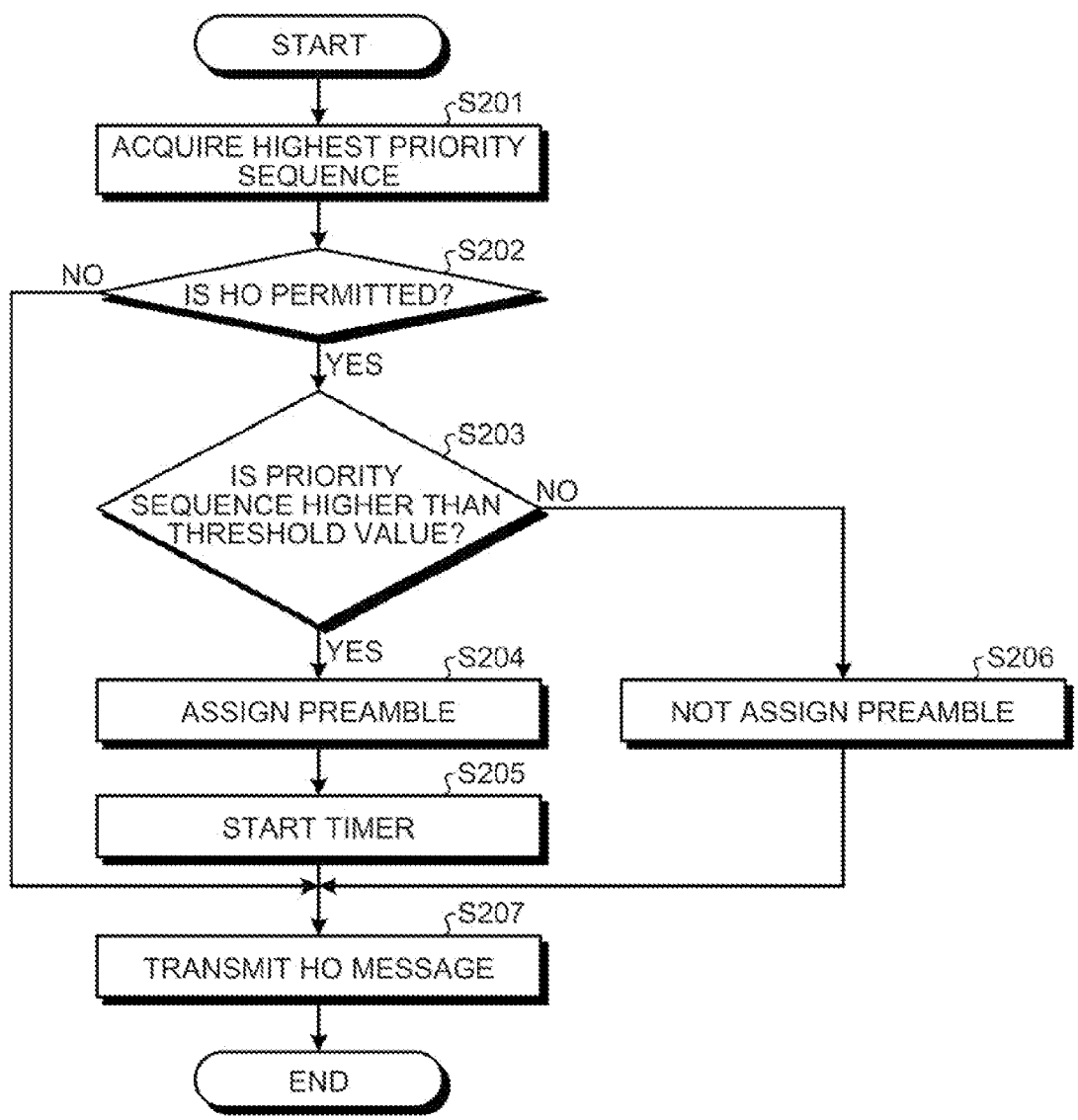
FIG. 6 is a flowchart illustrating an operation of the base station apparatus according to the second embodiment.

Next, it will be explained in detail about an operation of the base station apparatus 100-2 in the handover procedure described above with reference to a flowchart illustrated in FIG. 6. FIG. 6 is a flowchart illustrating an operation of the base station apparatus 100-2 according to the second embodiment. It will be below explained about an operation after the request of a handover and the terminal information of the terminal device 200 is received by the wired communication unit 106 of the base station apparatus 100-2.

When the request of a handover and the terminal information of the terminal device 200 are received by the wired communication unit 106, the priority sequence acquiring unit 108 acquires the highest priority sequence from the priority sequences corresponding to the QCIs included in the terminal information (Step S201). In other words, the priority sequence acquiring unit 108 acquires the highest value of the priority sequence from the priority sequences of the plurality of connections established by the terminal device 200 and outputs the highest value to the threshold value comparing unit 109.

On the other hand, because the request of a handover is also received by the wired communication unit 106, the HO processing unit 107 determines a margin or the like of a wireless resource and determines whether the handover of the terminal device 200 is permitted (Step S202). When the handover is not permitted as a result of the determination (Step S202: No), the HO message generating unit 111 generates an HO message indicating that the handover is rejected and transmits the HO message from the wired communication unit 106 to the terminal device 200 via the base station apparatus 100-1 (Step S207).

Moreover, when the handover of the terminal device 200 is permitted (Step S202: Yes), the threshold value comparing unit 109 determines whether the priority sequence acquired by the priority sequence acquiring unit 108 is higher than the predetermined order (Step S203). In other words, it is determined whether a connection of which the priority sequence is higher than the predetermined reference exists among connections established by the terminal device 200 and the priority of the terminal device 200 is high.

As a result of the determination, because the priority sequence is lower than the predetermined order and the value of the priority sequence is not less than the predetermined threshold value, it is determined that a preamble is not assigned to the terminal device 200 (Step S206) when it is determined that the priority of the terminal device 200 is low (Step S203: No). Therefore, the terminal device 200 performs a contention based random access by which a randomly selected preamble is transmitted.

On the other hand, because the priority sequence is higher than the predetermined order and the value of the priority sequence is less than the predetermined threshold value, it is determined that a preamble is assigned to the terminal device 200 (Step S204) when it is determined that the priority of the terminal device 200 is high (Step S203: Yes). Then, the assignment situation of the preamble performed by the preamble managing unit 110 is referred to by the HO message generating unit 111 and a not-assigned preamble is assigned to the terminal device 200. As a result, the preamble managing unit 110 stores the effect that the preamble assigned to the terminal device 200 is an already-assigned preamble. Simultaneously, the timer unit 112 starts a timer corresponding to the preamble assigned to the terminal device 200 (Step S205).

In this way, according to the present embodiment, the priority of the terminal device 200 is determined on the basis of the priority sequence indicated by the QCI of each connection, and a preamble is assigned if the priority of the terminal device 200 is high and a preamble is not assigned if the priority is low. For this reason, a terminal device having a high priority can use the assigned preamble to perform a non-contention based random access. As a result, the required QoS can be achieved without delaying synchronization establishment and communication start of a preferential terminal device that has a comparatively high required QoS. Moreover, because a preamble is not assigned to a terminal device having a low priority, the terminal device performs a contention based random access. As a result, it can be prevented to assign a preamble to a terminal device that has a comparatively low required QoS and thus is not preferential, and thus the shortage of a preamble can be suppressed.

When the assignment of a preamble to the terminal device 200 is performed, the HO message generating unit 111 generates an HO message for the notification of the assigned preamble. Specifically, when a preamble is assigned to the terminal device 200, an HO message instructing that a handover is performed by the assigned preamble is generated by the HO message generating unit 111. Moreover, when a preamble is not assigned to the terminal device 200, an HO message instructing that a handover is performed by a contention based random access is generated by the HO message generating unit 111.

Then, the HO message generated by the HO message generating unit 111 is transmitted to the base station apparatus 100-1 by the wired communication unit 106 (Step S207). After that, the HO message including assignment information is transmitted to the terminal device 200 via the wired communication unit 105 and the wireless communication unit 101 of the base station apparatus 100-1.

Figure 7:
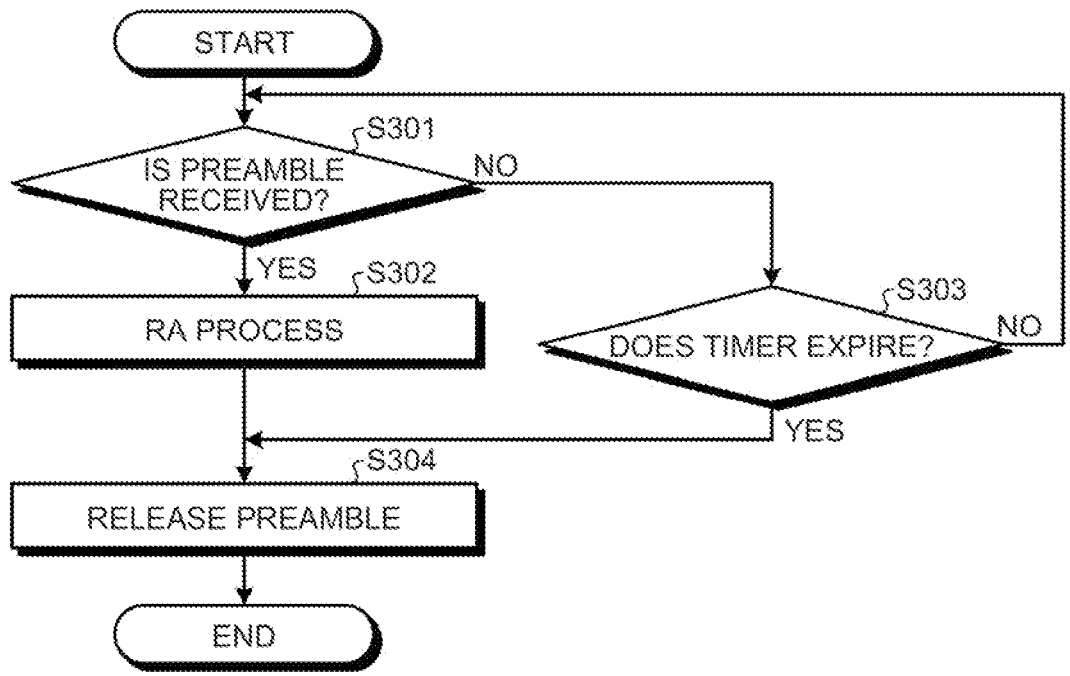
FIG. 7 is a flowchart illustrating a preamble booking process according to the second embodiment.

The terminal device 200 that receives the HO message transmits the assigned preamble to the base station apparatus 100-2 by using RACH and performs a non-contention based random access. During that time, the use of the preamble assigned to the terminal device 200 is reserved by the base station apparatus 100-2. Therefore, it will be explained about an operation of the base station apparatus 100-2 when the use of a preamble is reserved by the assignment of the preamble to the terminal device 200 with reference to a flowchart illustrated in FIG. 7.

After the HO message is transmitted from the wired communication unit 106, the wireless communication unit 113 waits to receive the preamble from the terminal device 200 (Step S301). In this case, while the preamble is not received (Step S301: No), the preamble managing unit 110 continuously confirms whether the timer of the timer unit 112 corresponding to the preamble assigned to the terminal device 200 expires (Step S303). Then, when the timer does not expire (Step S303: No), the wireless communication unit 113 continuously waits to receive the preamble from the terminal device 200.

Moreover, when the timer expires without receiving the preamble (Step S303: Yes), the preamble managing unit 110 releases the preamble (Step S304) because the effectiveness of the preamble assigned to the terminal device 200 is lost. In other words, the assignment situation of the preamble that is stored by the preamble managing unit 110 as an already-assigned preamble is changed to a non-assigned preamble. As a result, this preamble can be assigned to another terminal device. In this way, it can be prevented to leave the use of a preamble as the reserved state by providing an expiration date to the assigned preamble and thus the shortage of a preamble can be suppressed.

On the other hand, when the preamble is received by the wireless communication unit 113 during waiting the reception of the preamble (Step S301: Yes), the RA processing unit 114 establishes the synchronization with the terminal device 200 by using the random access process (Step S302). Because the assignment of a preamble to the terminal device 200 becomes unnecessary, the preamble managing unit 110 then releases the preamble (Step S304). In other words, the assignment situation of the preamble that is stored by the preamble managing unit 110 as an already-assigned preamble is changed to a non-assigned preamble.

As described above, according to the present embodiment, the priority of a terminal device that requests the assignment of a preamble is determined by the highest priority sequence among priority sequences of connections established by the terminal device and a preamble is assigned when the priority sequence is higher than a predetermined order. For this reason, because a terminal device having a comparatively high priority sequence can preferentially perform a non-contention based random access, it can be prevented to delay a communication start that is performed by a terminal device of which the bandwidth is assured and thus a required QoS can be achieved.

[c] Third Embodiment

According to the third embodiment, it is determined by an allowable delay corresponding to QCI whether or not a preamble is assigned to a terminal device.

Because a network configuration according to the present embodiment is similar to the network configuration of the second embodiment illustrated in FIG. 2, their descriptions are omitted. In other words, in the case of the present embodiment similarly to the second embodiment, it will be explained about a random access when the terminal device 200 performs a handover.

Figure 8:
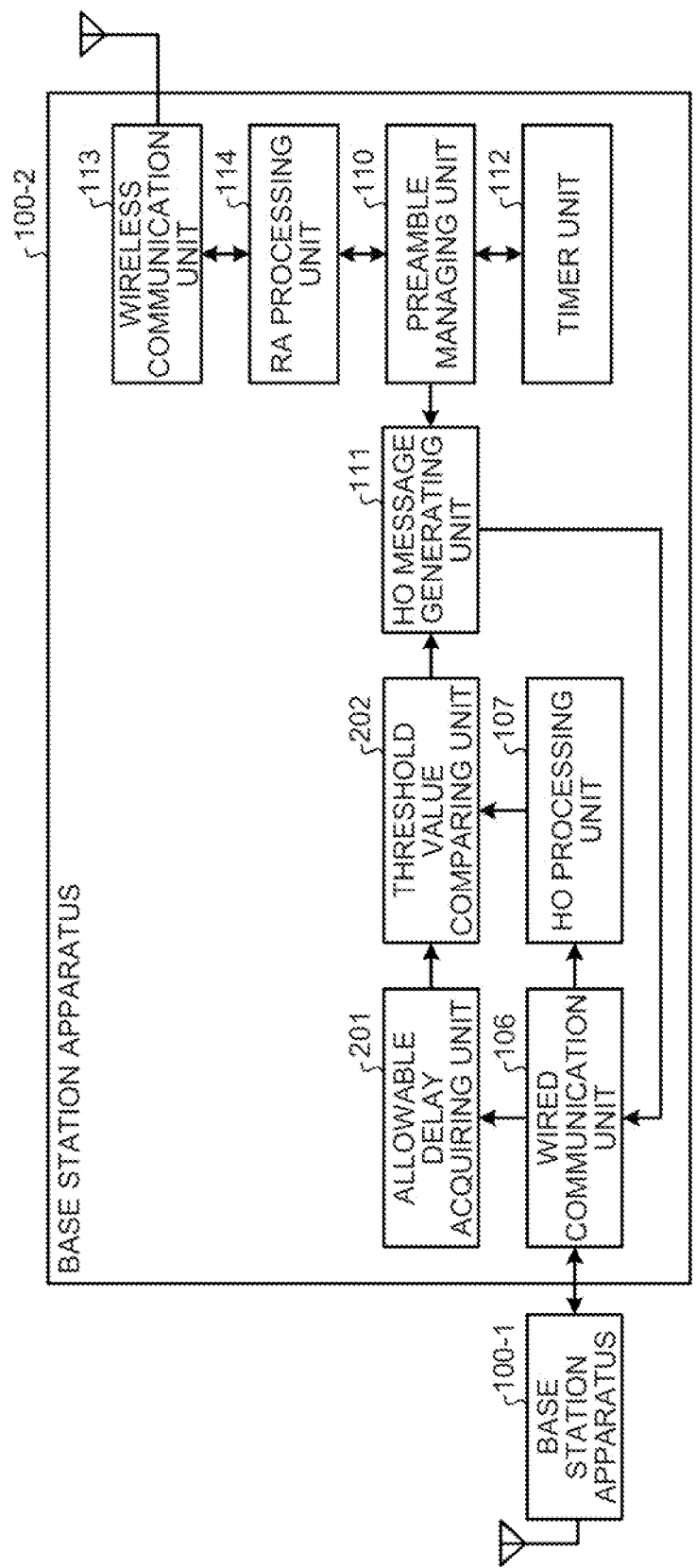
FIG. 8 is a block diagram illustrating the configuration of a base station apparatus according to a third embodiment.

FIG. 8 is a block diagram illustrating the configuration of the base station apparatus 100-2 according to the third embodiment. The same parts of FIG. 8 as those of FIG. 3 have the same reference numbers and their descriptions are omitted. Moreover, although the internal configuration of the base station apparatus 100-1 is omitted in FIG. 8, the internal configuration of the base station apparatus 100-1 is similar to that of FIG. 3.

The base station apparatus 100-2 illustrated in FIG. 8 includes an allowable delay acquiring unit 201 and a threshold value comparing unit 202 instead of the priority sequence acquiring unit 108 and the threshold value comparing unit 109 illustrated in FIG. 3.

The allowable delay acquiring unit 201 acquires a smallest allowable delay from terminal information received by the wired communication unit 106. In other words, as explained in the second embodiment, because the terminal information includes the QCIs of the plurality of connections established by the terminal device 200, allowable delays respectively correspond to the plurality of QCIs. Therefore, the allowable delay acquiring unit 201 acquires the smallest allowable delay from the allowable delays corresponding to the QCIs. For example, when the wired communication unit 106 receives QCIs "1", "3", and "6" from the QCIs illustrated in FIG. 4 as terminal information, the allowable delay acquiring unit 201 acquires an allowable delay "50 ms" corresponding to the QCI "3". Because an allowable delay has a severe condition as it is small, a connection having a small allowable delay may be a connection having a high priority.

When the handover of the terminal device 200 is permitted by the HO processing unit 107, the threshold value comparing unit 202 compares the allowable delay acquired by the allowable delay acquiring unit 201 and a predetermined threshold value. Then, when the allowable delay is smaller than the predetermined threshold value, the threshold value comparing unit 202 determines that a preamble is assigned to the terminal device 200. On the other hand, when the allowable delay is larger than the predetermined threshold value, the threshold value comparing unit 202 determines that a preamble is not assigned to the terminal device 200.

Figure 9:
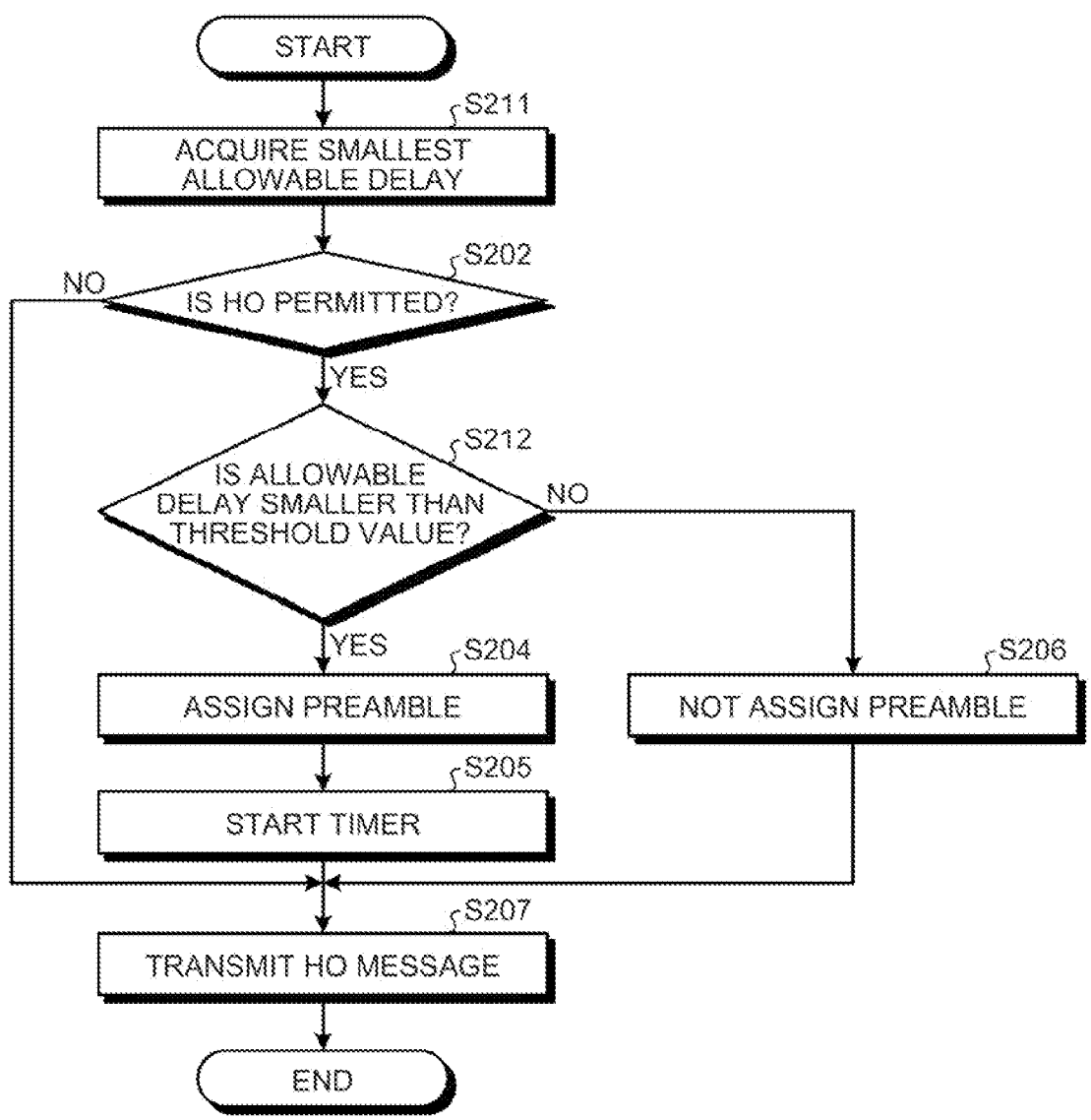
FIG. 9 is a flowchart illustrating an operation of the base station apparatus according to the third embodiment.

Now, it will be explained about an operation of the base station apparatus 100-2 constituted as described above with reference to a flowchart illustrated in FIG. 9. The same parts of FIG. 9 as those of FIG. 6 have the same reference numbers and their detailed descriptions are omitted. It will be below explained about an operation after the request of a handover and the terminal information of the terminal device 200 are received by the wired communication unit 106 of the base station apparatus 100-2.

When the request of a handover and the terminal information of the terminal device 200 are received by the wired communication unit 106, the allowable delay acquiring unit 201 acquires the smallest allowable delay from the allowable delays corresponding to the QCIs included in the terminal information (Step S211). In other words, the allowable delay acquiring unit 201 acquires the smallest allowable delay from the allowable delays of the plurality of connections established by the terminal device 200 and outputs the smallest allowable delay to the threshold value comparing unit 202.

On the other hand, because the request of a handover is also received by the wired communication unit 106, the HO processing unit 107 determines whether the handover of the terminal device 200 is permitted (Step S202). When the handover is not permitted as the result of the determination (Step S202: No), an HO message indicating the effect that the handover is rejected is generated by the HO message generating unit 111 and the HO message is transmitted from the wired communication unit 106 to the terminal device 200 via the base station apparatus 100-1 (Step S207).

Moreover, when the handover of the terminal device 200 is permitted (Step S202: Yes), the threshold value comparing unit 202 determines whether the allowable delay acquired by the allowable delay acquiring unit 201 is smaller than the predetermined threshold value (Step S212). In other words, it is determined whether a connection of which the allowable delay is smaller than the predetermined reference and that has a severe condition exists among the connections established by the terminal device 200 and the priority of the terminal device 200 is high.

When it is determined that the allowable delay is larger than the predetermined threshold value and the priority of the terminal device 200 is low as the result of the determination (Step S212: No), it is determined that a preamble is not assigned to the terminal device 200 (Step S206). On the other hand, when it is determined that the allowable delay is smaller than the predetermined threshold value and the priority of the terminal device 200 is high (Step S212: Yes), it is determined that a preamble is assigned to the terminal device 200 (Step S204). After that, similarly to the second embodiment, the HO message is generated by the HO message generating unit 111 and is transmitted from the wired communication unit 106 to the base station apparatus 100-1 (Step S207).

In this way, according to the present embodiment, the base station apparatus determines the priority of the terminal device 200 on the basis of the allowable delay indicated by the QCI of each connection, and assigns a preamble if the priority of the terminal device 200 is high and does not assign a preamble if the priority of the terminal device 200 is low. For this reason, a terminal device having a high priority can perform a non-contention based random access by using the assigned preamble. As a result, a required QoS can be achieved without delaying the synchronization establishment and communication start of a preferential terminal device having a comparatively high required QoS. Moreover, because a preamble is not assigned to a terminal device having a low priority, the terminal device performs a contention based random access. As a result, it can be prevented to assign a preamble to a terminal device that has a comparatively low required QoS and should not be preferential, and thus the shortage of a preamble can be suppressed.

As described above, according to the present embodiment, the base station apparatus determines the priority of a terminal device that requests the assignment of a preamble by using the smallest allowable delay among the allowable delays of the connections established by the terminal device and assigns a preamble when the allowable delay is smaller than the predetermined threshold value. For this reason, because a terminal device having a comparatively small allowable delay can preferentially perform a non-contention based random access, it can be prevented to delay a communication start performed by a terminal device of which the bandwidth is assured and thus a required QoS can be achieved.

Moreover, according to the third embodiment, the priority of the terminal device 200 is determined by using an allowable delay corresponding to QCI. However, the priority of the terminal device 200 can be also determined by using an allowable loss ratio corresponding to QCI. Because an allowable loss ratio has a severe condition as it is small, a connection having a small allowable loss ratio may be a connection having a high priority. Therefore, the base station apparatus may acquire the smallest allowable loss ratio from terminal information and assign a preamble to the terminal device 200 when the acquired allowable loss ratio is smaller than the predetermined threshold value.

[d] Fourth Embodiment

According to the fourth embodiment, it is determined whether a preamble is assigned to a terminal device in accordance with a resource type corresponding to QCI.

Because a network configuration according to the present embodiment is similar to the network configuration of the second embodiment illustrated in FIG. 2, their descriptions are omitted. In other words, in the case of the present embodiment similarly to the second embodiment, it will be explained about a random access when the terminal device 200 performs a handover.

Figure 10:
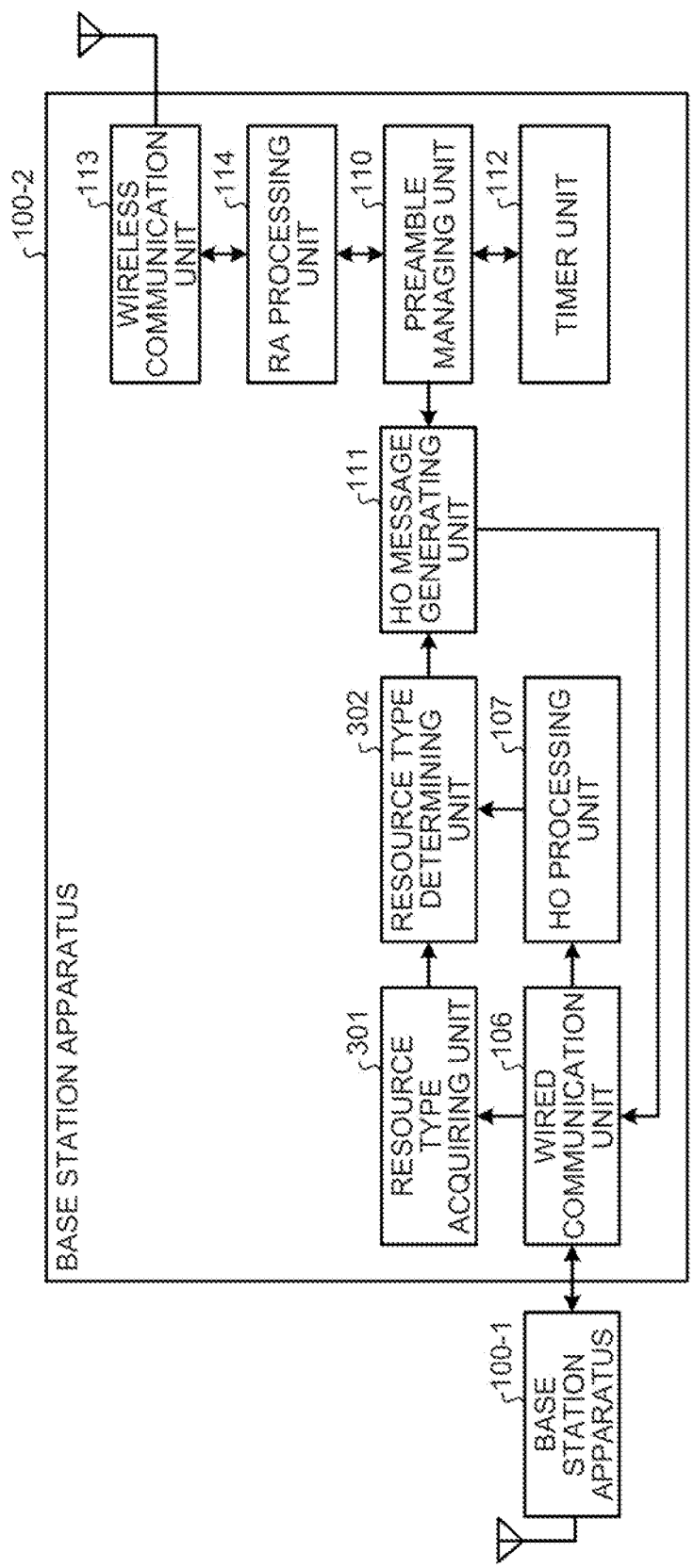
FIG. 10 is a block diagram illustrating the configuration of a base station apparatus according to a fourth embodiment.

FIG. 10 is a block diagram illustrating the configuration of the base station apparatus 100-2 according to the fourth embodiment. The same parts of FIG. 10 as those of FIG. 3 have the same reference numbers and their descriptions are omitted. Moreover, although the internal configuration of the base station apparatus 100-1 is omitted in FIG. 10, the internal configuration of the base station apparatus 100-1 is similar to that of FIG. 3.

The base station apparatus 100-2 illustrated in FIG. 10 includes a resource type acquiring unit 301 and a resource type determining unit 302 instead of the priority sequence acquiring unit 108 and the threshold value comparing unit 109 illustrated in FIG. 3.

The resource type acquiring unit 301 acquires a resource type corresponding to the QCI of each connection from the terminal information received by the wired communication unit 106. In other words, as explained in the second embodiment, because the terminal information includes the QCIs of the plurality of connections established by the terminal device 200, resource types respectively correspond to the plurality of QCIs. Therefore, the resource type acquiring unit 301 acquires a resource type "GBR" or "Non-GBR" corresponding to each QCI. For example, when the wired communication unit 106 receives QCIs "1", "3", and "6" among the QCIs illustrated in FIG. 4 as terminal information, the resource type acquiring unit 301 acquires the corresponding "GBR", "GBR", and "Non-GBR". Because a bandwidth should be assured when a resource type is GBR, a connection corresponding to GBR may be a connection having a high priority.

When the handover of the terminal device 200 is permitted by the HO processing unit 107, the resource type determining unit 302 determines whether or not "GBR" exists among the resource types acquired by the resource type acquiring unit 301. Then, the resource type determining unit 302 determines that a preamble is assigned to the terminal device 200 even when only one "GBR" exists. On the other hand, when only "Non-GBR" exists, the resource type determining unit 302 determines that a preamble is not assigned to the terminal device 200.

Figure 11:
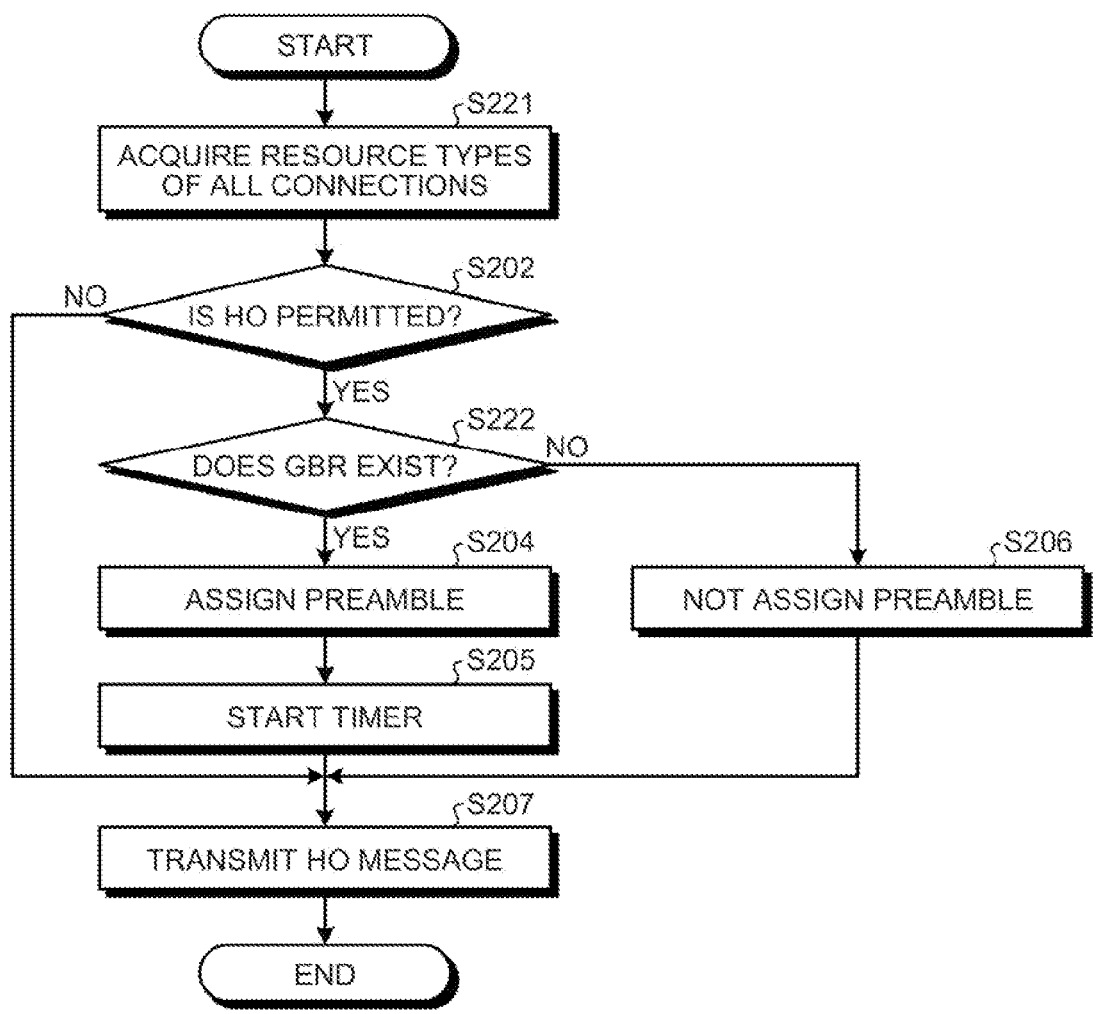
FIG. 11 is a flowchart illustrating an operation of the base station apparatus according to the fourth embodiment.

Now, it will be explained about an operation of the base station apparatus 100-2 constituted as described above with reference to a flowchart illustrated in FIG. 11. The same parts of FIG. 11 as those of FIG. 6 have the same reference numbers and their detailed descriptions are omitted. It will be below explained about an operation after the request of a handover and the terminal information of the terminal device 200 are received by the wired communication unit 106 of the base station apparatus 100-2.

When the request of a handover and the terminal information of the terminal device 200 are received by the wired communication unit 106, the resource type acquiring unit 301 acquires resource types corresponding to the QCIs of all connections included in the terminal information (Step S221). In other words, the resource type acquiring unit 301 acquires the resource types of the plurality of connections established by the terminal device 200 and outputs the acquired resource types to the resource type determining unit 302.

On the other hand, because the request of a handover is also received by the wired communication unit 106, the HO processing unit 107 determines whether the handover of the terminal device 200 is permitted (Step S202). When the handover is not permitted as the result of the determination (Step S202: No), an HO message indicating that the handover is rejected is generated by the HO message generating unit 111 and is transmitted from the wired communication unit 106 to the terminal device 200 via the base station apparatus 100-1 (Step S207).

Moreover, when the handover of the terminal device 200 is permitted (Step S202: Yes), the resource type determining unit 302 determines whether "GBR" is included in the resource types acquired by the resource type acquiring unit 301 (Step S222). In other words, it is determined whether a connection of the resource type "GBR" of which the bandwidth is assured exists among the connections established by the terminal device 200 and the priority of the terminal device 200 is high.

As the result of the determination, when it is determined that all resource types are "Non-GBR" and the priority of the terminal device 200 is low (Step S222: No), it is determined that a preamble is not assigned to the terminal device 200 (Step S206). On the other hand, when it is determined that at least one resource type is "GBR" and the priority of the terminal device 200 is high (Step S222: Yes), it is determined that a preamble is assigned to the terminal device 200 (Step S204). After that, similarly to the second embodiment, the HO message is generated by the HO message generating unit 111 and is transmitted from the wired communication unit 106 to the base station apparatus 100-1 (Step S207).

In this way, according to the present embodiment, the base station apparatus determines the priority of the terminal device 200 on the basis of the resource type indicated by the QCI of each connection, and assigns a preamble if the priority of the terminal device 200 is high and does not assign a preamble if the priority is low. For this reason, a terminal device having a high priority can perform a non-contention based random access by using the assigned preamble. As a result, a required QoS can be achieved without delaying the synchronization establishment and communication start of a preferential terminal device that has a comparatively high required QoS. Moreover, because a preamble is not assigned to a terminal device having a low priority, the terminal device performs a contention based random access. As a result, it can be prevented to assign a preamble to a terminal device that has a comparatively low required QoS and should not be preferential and thus the shortage of a preamble can be suppressed.

As described above, according to the present embodiment, the base station apparatus determines the priority of a terminal device that requests the assignment of a preamble by using the resource types of the connections established by the terminal device and assigns a preamble when a resource type for assuring a bandwidth exists. For this reason, because a terminal device that has a connection requiring a constant bandwidth can preferentially perform a non-contention based random access, it can be prevented to delay a communication start performed by a terminal device of which the bandwidth is assured and thus a required QoS can be achieved.

[e] Fifth Embodiment

In the second to fourth embodiments, it has been explained about a random access when the terminal device 200 performs a handover. However, a random access is also executed, for example, when the synchronization establishment of an uplink is required in addition to the case of a handover. Therefore, in the fifth embodiment, it will be explained about a random access that is executed by the terminal device 200 when the out of synchronism of an uplink occurs. In other words, in the fifth embodiment, a priority is determined from terminal information on a specified connection that transmits and receives data between a base station apparatus and a terminal device and it is determined whether or not a preamble is assigned to the terminal device.

Although a network configuration according to the present embodiment is similar to the network configuration of the second embodiment illustrated in FIG. 2, the terminal device 200 does not perform a handover in the present embodiment. Therefore, it will be below explained about a random access between the base station apparatus 100 and the terminal device 200. Specifically, it will be explained about a random access when the out of synchronism of an uplink used for a retransmission request or the like occurs when there is data that should be transmitted from the base station apparatus 100 to the terminal device 200 by using a downlink.

Figure 12:
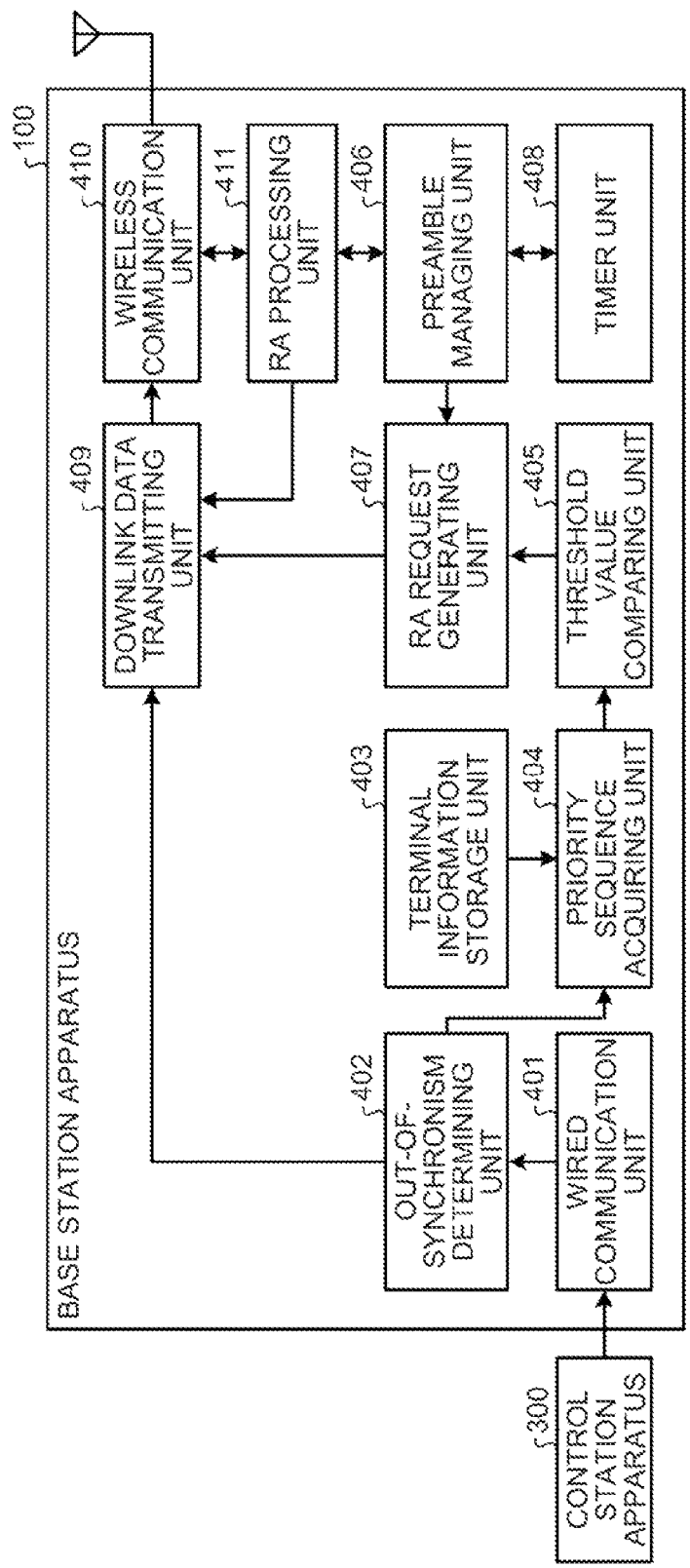
FIG. 12 is a block diagram illustrating the configuration of a base station apparatus according to a fifth embodiment.

FIG. 12 is a block diagram illustrating the configuration of the base station apparatus 100 according to the fifth embodiment. The base station apparatus 100 illustrated in FIG. 12 includes a wired communication unit 401, an out-of-synchronism determining unit 402, a terminal information storage unit 403, a priority sequence acquiring unit 404, a threshold value comparing unit 405, a preamble managing unit 406, an RA request generating unit 407, a timer unit 408, a downlink data transmitting unit 409, a wireless communication unit 410, and an RA processing unit 411.

The wired communication unit 401 receives user data for which the transmission destination is the terminal device 200 from the control station device 300. In other words, the wired communication unit 401 receives data (hereinafter, "downlink data"), which should be transmitted to the terminal device 200 by using a downlink, from the control station device 300. Moreover, the wired communication unit 401 is connected to the control station device 300 by using an S1 interface.

When the downlink data is received by the wired communication unit 401, the out-of-synchronism determining unit 402 determines whether the out of synchronism of an uplink between itself and the terminal device 200 occurs or not. Specifically, for example, when a predetermined time or more passes after the synchronization of an uplink is established, the out-of-synchronism determining unit 402 determines that the out of synchronism of the uplink occurs. In other words, because an uplink is a line that goes from the terminal device 200 to the base station apparatus 100, the out of synchronism occurs when a time for which the terminal device 200 does not transmit data is continued. For this reason, when a long time passes from synchronization establishment, the out-of-synchronism determining unit 402 determines that the out of synchronism of an uplink occurs.

Then, the out-of-synchronism determining unit 402 outputs downlink data to the downlink data transmitting unit 409. At this time, when the out of synchronism of an uplink occurs, the out-of-synchronism determining unit 402 instructs the downlink data transmitting unit 409 to transmit the downlink data after the synchronization of the uplink is established. When the out of synchronism of the uplink occurs, the terminal device 200 cannot execute the return of ACK, an automatic repeat request (HARQ), and the like even if the downlink data is transmitted. For this reason, the out-of-synchronism determining unit 402 causes the downlink data transmitting unit 409 to wait the transmission of downlink data.

The terminal information storage unit 403 stores therein terminal information of terminal devices in a network that includes the terminal device 200. Specifically, the terminal information storage unit 403 stores, for example, QCI that is the index value of QoS set for each connection established by a terminal device as the terminal information of each terminal device. In other words, the terminal information storage unit 403 stores the same terminal information as that of the terminal information storage unit 103 according to the second embodiment.

When it is determined by the out-of-synchronism determining unit 402 that the out of synchronism of the uplink occurs, the priority sequence acquiring unit 404 acquires a priority sequence corresponding to a connection used for the transmission of downlink data from the terminal information of the terminal device 200 stored in the terminal information storage unit 403. In other words, because a random access for synchronization establishment is executed when the out of synchronism of the uplink occurs, the priority sequence acquiring unit 404 acquires a priority sequence in order to determine whether a preamble is assigned to the terminal device 200. Moreover, as described above, because the terminal information includes the QCIs of the plurality of connections established by the terminal device 200, priority sequences respectively correspond to the plurality of QCIs. Therefore, the priority sequence acquiring unit 404 acquires a priority sequence of a connection used for the transmission of actual downlink data, an automatic repeat request, and the like among the priority sequences corresponding to the QCIs.

The threshold value comparing unit 405 compares the priority sequence acquired by the priority sequence acquiring unit 404 and a predetermined threshold value. Then, when the priority sequence is higher than a predetermined order (in other words, the value of the priority sequence is less than the predetermined threshold value), the threshold value comparing unit 405 determines that a preamble is assigned to the terminal device 200. On the other hand, when the priority sequence is lower than the predetermined order and the value of the priority sequence is not less than the predetermined threshold value, the threshold value comparing unit 405 determines that a preamble is not assigned to the terminal device 200.

The preamble managing unit 406 stores an utilizable preamble group and manages an assignment situation in which preambles are assigned to terminal devices. In other words, the preamble managing unit 406 stores the effect that a preamble is an already-assigned preamble when the preamble is assigned to a terminal device by the RA request generating unit 407. Moreover, the preamble managing unit 406 releases a preamble that is used for the synchronization establishment in the RA processing unit 411 and a preamble for which the corresponding timer of the timer unit 408 expires and then stores the effect that the preambles are not-assigned preambles.

When it is determined that a preamble is assigned to the terminal device 200 as the result of the comparison performed by the threshold value comparing unit 405, the RA request generating unit 407 refers to the assignment situation of the preamble managing unit 406 and assigns a not-assigned preamble to the terminal device 200. Then, the RA request generating unit 407 generates an RA request that includes a preamble to be assigned to the terminal device 200. On the other hand, when it is determined that a preamble is not assigned to the terminal device 200 as the result of the comparison performed by the threshold value comparing unit 405, the RA request generating unit 407 generates an RA request that indicates the effect that a preamble is not assigned to the terminal device 200.

The timer unit 408 includes a timer corresponding to each of the preambles that are managed by the preamble managing unit 406. When a preamble is assigned to the terminal device by the RA request generating unit 407, the timer unit 408 starts the corresponding timer. Then, when the timer expires, the timer unit 408 instructs the preamble managing unit 406 to release the corresponding preamble.

The downlink data transmitting unit 409 transmits the downlink data output from the out-of-synchronism determining unit 402 to the wireless communication unit 410, and the wireless communication unit 410 transmits the downlink data to the terminal device 200. However, the downlink data transmitting unit 409 waits the transmission of downlink data when it is instructed by the out-of-synchronism determining unit 402 to wait the transmission of downlink data. Then, when the effect that the synchronization of the uplink is established is reported from the RA processing unit 411, the downlink data transmitting unit 409 performs the transmission of the waited downlink data. Moreover, the downlink data transmitting unit 409 transmits the RA request generated by the RA request generating unit 407 to the terminal device 200 via the wireless communication unit 410.

The wireless communication unit 410 wirelessly communicates with the terminal device 200 via an antenna. Specifically, the wireless communication unit 410 transmits the downlink data and the RA request to the terminal device 200 via the antenna. Moreover, the wireless communication unit 410 receives the preamble transmitted from the terminal device 200 via the antenna and outputs the preamble to the RA processing unit 411.

The RA processing unit 411 performs a random access process by using the preamble output from the wireless communication unit 410, and establishes the synchronization with the terminal device 200. Then, the RA processing unit 411 informs the preamble managing unit 406 of the effect that the preamble used for synchronization establishment is an already-used preamble. Simultaneously, the RA processing unit 411 informs the downlink data transmitting unit 409 of the effect that the synchronization of the uplink is established.

Figure 13:
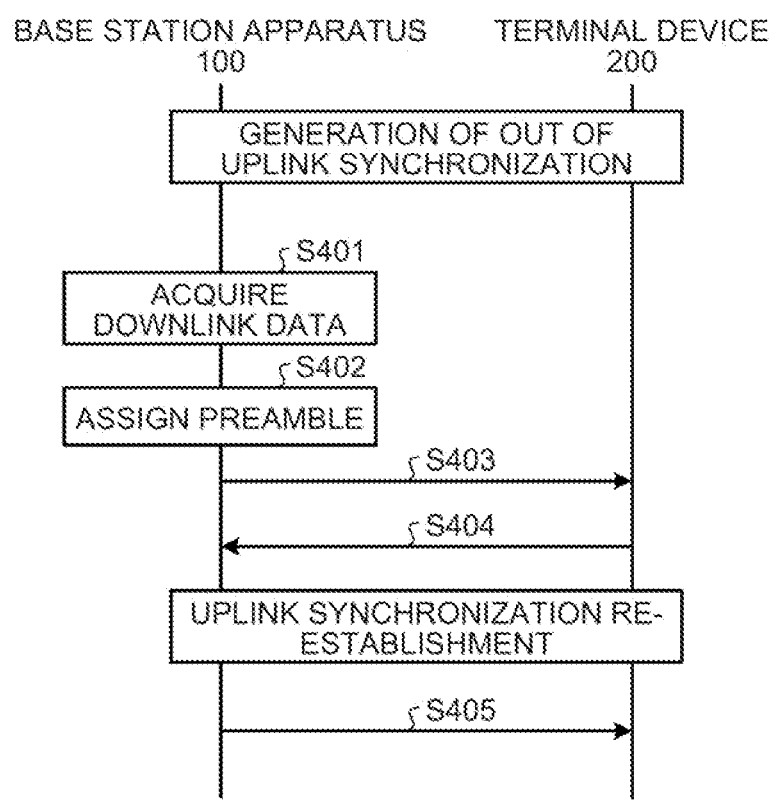
FIG. 13 is a sequence diagram illustrating a downlink data transmission procedure according to the fifth embodiment.

Now, it will be explained about a downlink data transmission procedure from the base station apparatus 100 to the terminal device 200 with reference to FIG. 13. FIG. 13 is a sequence diagram illustrating a downlink data transmission procedure when the out of synchronism of an uplink occurs.

When a predetermined time passes as data is not transmitted from the terminal device 200 to the base station apparatus 100, the out of synchronism of an uplink occurs. When the base station apparatus 100 receives the downlink data from the control station device 300 in this state (Step S401), the terminal device 200 cannot execute the return of ACK and an automatic repeat request even if the downlink data is transmitted to the terminal device 200. Similarly, even when the base station apparatus 100 generates control data that should be transmitted to the terminal device 200, the terminal device 200 cannot execute the return of ACK and an automatic repeat request.

Therefore, when the out-of-synchronism determining unit 402 determines that the out of synchronism of an uplink occurs, the downlink data transmitting unit 409 waits to transmit the downlink data without transmitting the data at once until the synchronization of the uplink is established. Then, the priority sequence acquiring unit 404 acquires a priority sequence of a connection that is actually used for the transmission of downlink data, an automatic repeat request, and the like. The value of the acquired priority sequence is output to the threshold value comparing unit 405. Then, the threshold value comparing unit 405 compares the value of the priority sequence output from the priority sequence acquiring unit 404 and the predetermined threshold value. Because the fact that a priority sequence is higher than a predetermined order means that the priority of a connection that is actually used for the transmission of downlink data and an automatic repeat request is high, it is decided that a preamble is assigned to the terminal device 200. In this case, although it is decided that a preamble is not assigned to the terminal device 200 when the priority sequence is lower than the predetermined order, it will be below continuously explained about the case where the priority sequence is higher than the predetermined order.

When it is decided by the threshold value comparing unit 405 that a preamble is assigned to the terminal device 200, the RA request generating unit 407 assigns a preamble, which is managed by the preamble managing unit 406 as a not-assigned preamble, to the terminal device 200 (Step S402). Then, an RA request including the assigned preamble is generated by the RA request generating unit 407 and is transmitted from the wireless communication unit 410 to the terminal device 200 (Step S403). Moreover, at the same time as the assignment of the preamble to the terminal device 200, the preamble managing unit 406 stores the effect that the preamble assigned to the terminal device 200 is an already-assigned preamble and starts a timer of the timer unit 408 corresponding to the preamble. In other words, the use of the preamble by the terminal device 200 is reserved until the timer of the timer unit 408 expires, and thus the preamble is not assigned to another terminal device.

Because the preamble is included in the received RA request, the terminal device 200 transmits the preamble to the base station apparatus 100 by using RACH (Step S404). As a result, in the base station apparatus 100, the random access process is executed by the RA processing unit 411 and the synchronization between itself and the terminal device 200 is established again. Then, the fact that the synchronization of the uplink is again established is reported from the RA processing unit 411 to the downlink data transmitting unit 409, and then the downlink data transmitting unit 409 resumes to transmit the waited downlink data. As a result, the downlink data is transmitted from the wireless communication unit 410 to the terminal device 200 via the antenna (Step S405).

Figure 14:
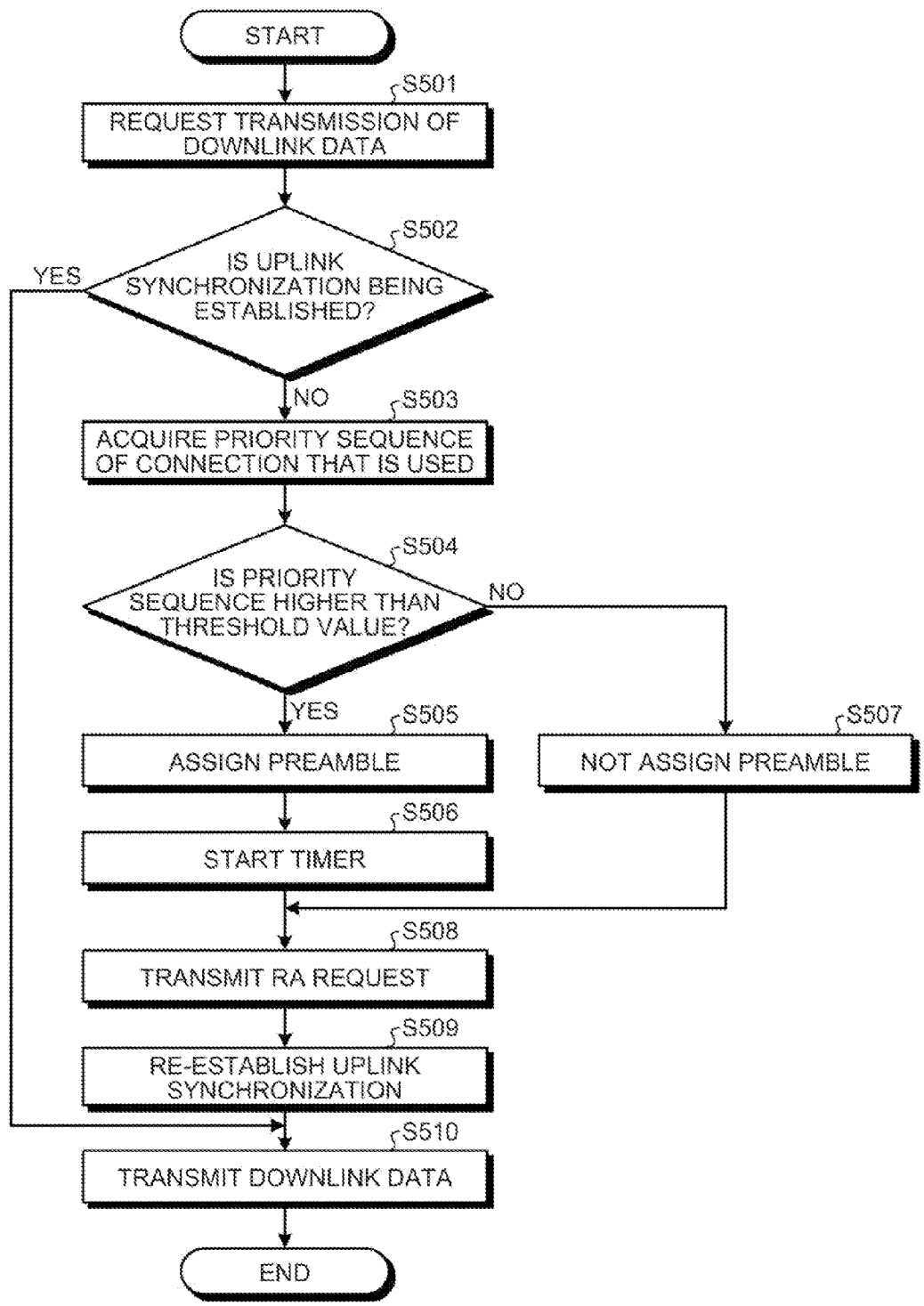
FIG. 14 is a flowchart illustrating an operation of the base station apparatus according to the fifth embodiment.

Next, it will be explained in detail about the operations of the downlink data transmission procedure described above that are performed by the base station apparatus 100 with reference to a flowchart illustrated in FIG. 14. FIG. 14 is a flowchart illustrating an operation of the base station apparatus 100 according to the fifth embodiment.

When user data for the terminal device 200 is received by the wired communication unit 401 or control data for the terminal device 200 is generated by the base station apparatus 100, it leads to request the transmission of downlink data to the terminal device 200 (Step S501). When the transmission of downlink data is requested, the out-of-synchronism determining unit 402 determines whether the synchronization of the uplink from the terminal device 200 to the base station apparatus 100 is being established (Step S502). As a result of the determination, if the synchronization of the uplink is being established (Step S502: Yes), the downlink data is immediately transmitted from the downlink data transmitting unit 409 to the terminal device 200 via the wireless communication unit 410 (Step S510). This reason is that the terminal device 200 can execute the return of ACK and an automatic repeat request even if downlink data is immediately transmitted to the terminal device 200 when the synchronization of the uplink is being established.

On the other hand, when the out of synchronism of the uplink occurs (Step S502: No), the downlink data transmitting unit 409 stops transmitting the downlink data and waits to again establish the synchronization of the uplink. Then, the priority sequence acquiring unit 404 acquires a priority sequence corresponding to QCI of the connection that is actually used by the terminal device 200 from the terminal information storage unit 403 (Step S503). In other words, the priority sequence acquiring unit 404 acquires the value of the priority sequence of the connection that is actually used for the transmission of downlink data and an automatic repeat request, and outputs the value to the threshold value comparing unit 405.

Then, the threshold value comparing unit 405 determines whether the priority sequence acquired by the priority sequence acquiring unit 404 is higher than the predetermined order (Step S504). In other words, it is determined whether the priority sequence of the connection that is actually used for the transmission of downlink data and an automatic repeat request is higher than the predetermined reference and the priority of the terminal device 200 is high.

As a result of the determination, when it is determined that the priority sequence is lower than the predetermined order (in other words, the value of the priority sequence is not less than the predetermined threshold value) and the priority of the terminal device 200 is low (Step S504: No), it is determined that a preamble is not assigned to the terminal device 200 (Step S507). Therefore, the terminal device 200 performs a contention based random access by which a randomly selected preamble is transmitted.

On the other hand, when it is determined that the priority sequence is higher than the predetermined order (in other words, the value of the priority sequence is less than the predetermined threshold value) and the priority of the terminal device 200 is high (Step S504: Yes), it is determined that a preamble is assigned to the terminal device 200 (Step S505). Then, the RA request generating unit 407 refers to the assignment situation of preambles managed by the preamble managing unit 406 and assigns a not-assigned preamble to the terminal device 200. As a result, the preamble managing unit 406 stores the effect that the preamble assigned to the terminal device 200 is an already-assigned preamble. Simultaneously, the timer unit 408 starts a timer corresponding to the preamble assigned to the terminal device 200 (Step S506).

When the assignment of a preamble to the terminal device 200 is performed, the RA request generating unit 407 generates an RA request by which the assigned preamble is reported. Specifically, when a preamble is assigned to the terminal device 200, an RA request including the assigned preamble is generated by the RA request generating unit 407. Moreover, when a preamble is not assigned to the terminal device 200, an RA request indicating that the synchronization of the uplink is again established by using a contention based random access is generated by the RA request generating unit 407.

Then, the RA request generated by the RA request generating unit 407 is transmitted to the terminal device 200 via the downlink data transmitting unit 409 and the wireless communication unit 410 (Step S508). The transmitted RA request is received by the terminal device 200, and the terminal device 200 performs a non-contention based random access or a contention based random access in accordance with the RA request. In other words, the terminal device 200 transmits the preamble included in the RA request to the base station apparatus 100, and the transmitted preamble is received by the wireless communication unit 410 of the base station apparatus 100. Then, the RA processing unit 411 again establishes the synchronization of the uplink by using the random access process (Step S509). When the synchronization of the uplink is again established, the effect is reported from the RA processing unit 411 to the downlink data transmitting unit 409 and the downlink data transmitting unit 409 resumes the transmission of downlink data to transmit the downlink data from the wireless communication unit 410 (Step S510).

As described above, according to the present embodiment, it is determined whether the out of synchronism of the uplink used for retransmission request or the like occurs between itself and a terminal device that is a transmission destination of downlink data. When the out of synchronism occurs, the base station apparatus determines the priority of the terminal device by using a priority sequence of a connection that is used for the transmission of downlink data, and assigns a preamble when the priority sequence is higher than the predetermined order. For this reason, a terminal device having a comparatively high priority sequence can preferentially perform a non-contention based random access and thus the synchronization of an uplink can be quickly established. As a result, it can be prevented to delay the transmission of downlink data to a terminal device of which the bandwidth is assured and thus a required QoS can be achieved.

Moreover, in the fifth embodiment, the priority of the terminal device 200 is determined by using a priority sequence corresponding to QCI. However, similarly to the third and fourth embodiments, the priority of the terminal device 200 can be determined by using an allowable delay, an allowable loss ratio, and a resource type corresponding to QCI.

[f] Sixth Embodiment

According to the sixth embodiment, when a preamble is assigned to a terminal device, a time for which the preamble is assured for the terminal device is adaptively set in accordance with the priority of the terminal device.

Although a network configuration according to the present embodiment is similar to the network configuration of the second embodiment illustrated in FIG. 2, the present embodiment explains a random access between the base station apparatus 100 and the terminal device 200 similarly to the fifth embodiment. Specifically, it will be explained about a random access when the out of synchronism of an uplink used for a retransmission request or the like occurs when there is data that should be transmitted from the base station apparatus 100 to the terminal device 200 by using a downlink.

Figure 15:
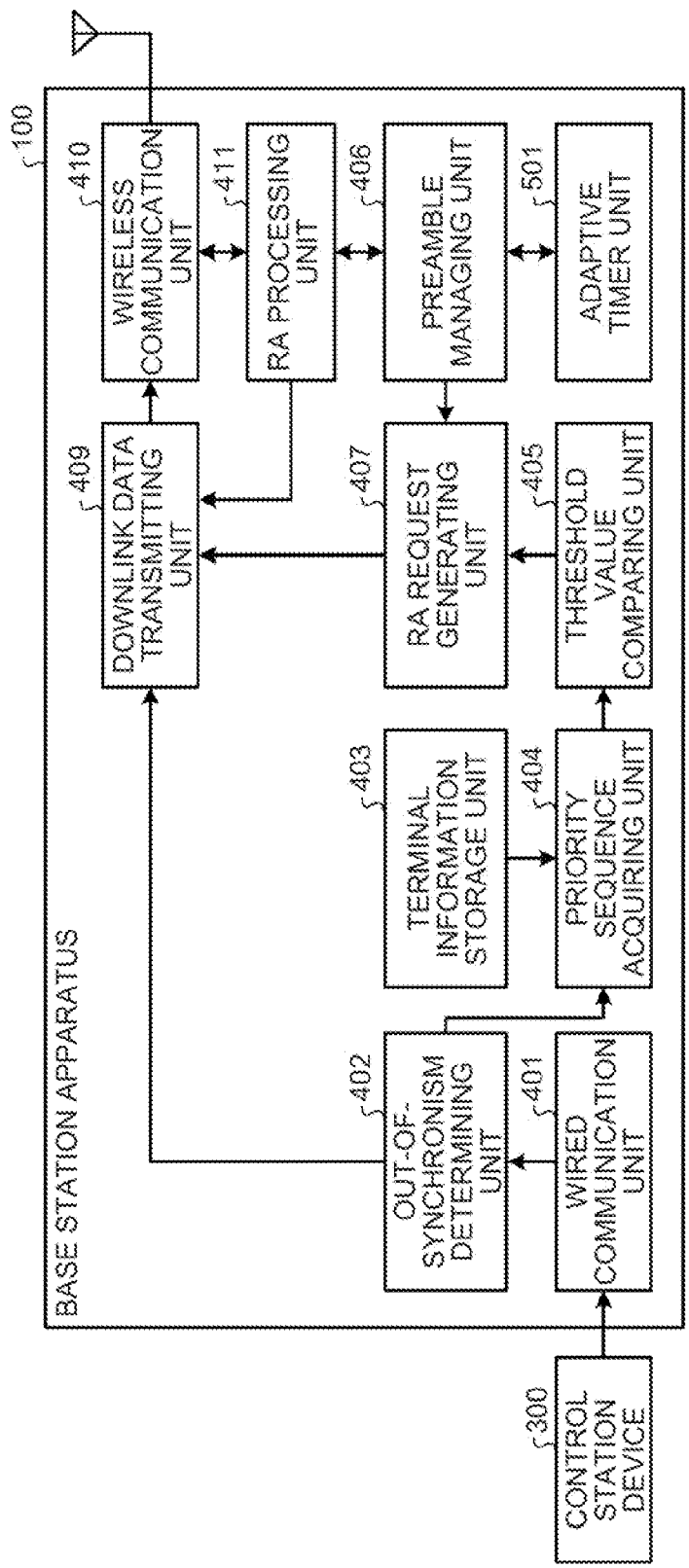
FIG. 15 is a block diagram illustrating the configuration of a base station apparatus according to a sixth embodiment.

FIG. 15 is a block diagram illustrating the configuration of the base station apparatus 100 according to the sixth embodiment. The same parts of FIG. 15 as those of FIG. 12 have the same reference numbers and their descriptions are omitted. The base station apparatus 100 illustrated in FIG. 15 includes an adaptive timer unit 501 instead of the timer unit 408 illustrated in FIG. 12.

The adaptive timer unit 501 includes a timer corresponding to each preamble that is managed by the preamble managing unit 406. When a preamble is assigned to a terminal device by the RA request generating unit 407, the adaptive timer unit 501 starts the corresponding timer. At this time, the adaptive timer unit 501 sets a time according to the priority sequence, which is compared with the predetermined threshold value by the threshold value comparing unit 405, as the expiration time of the timer. In other words, the adaptive timer unit 501 sets an expiration time so that the expiration time becomes longer as the priority sequence is higher, so as to lengthen a time assured by a preamble assigned to the terminal device 200 having a comparatively high priority sequence. Then, when the timer expires, the adaptive timer unit 501 instructs the preamble managing unit 406 to release the corresponding preamble.

Figure 16:
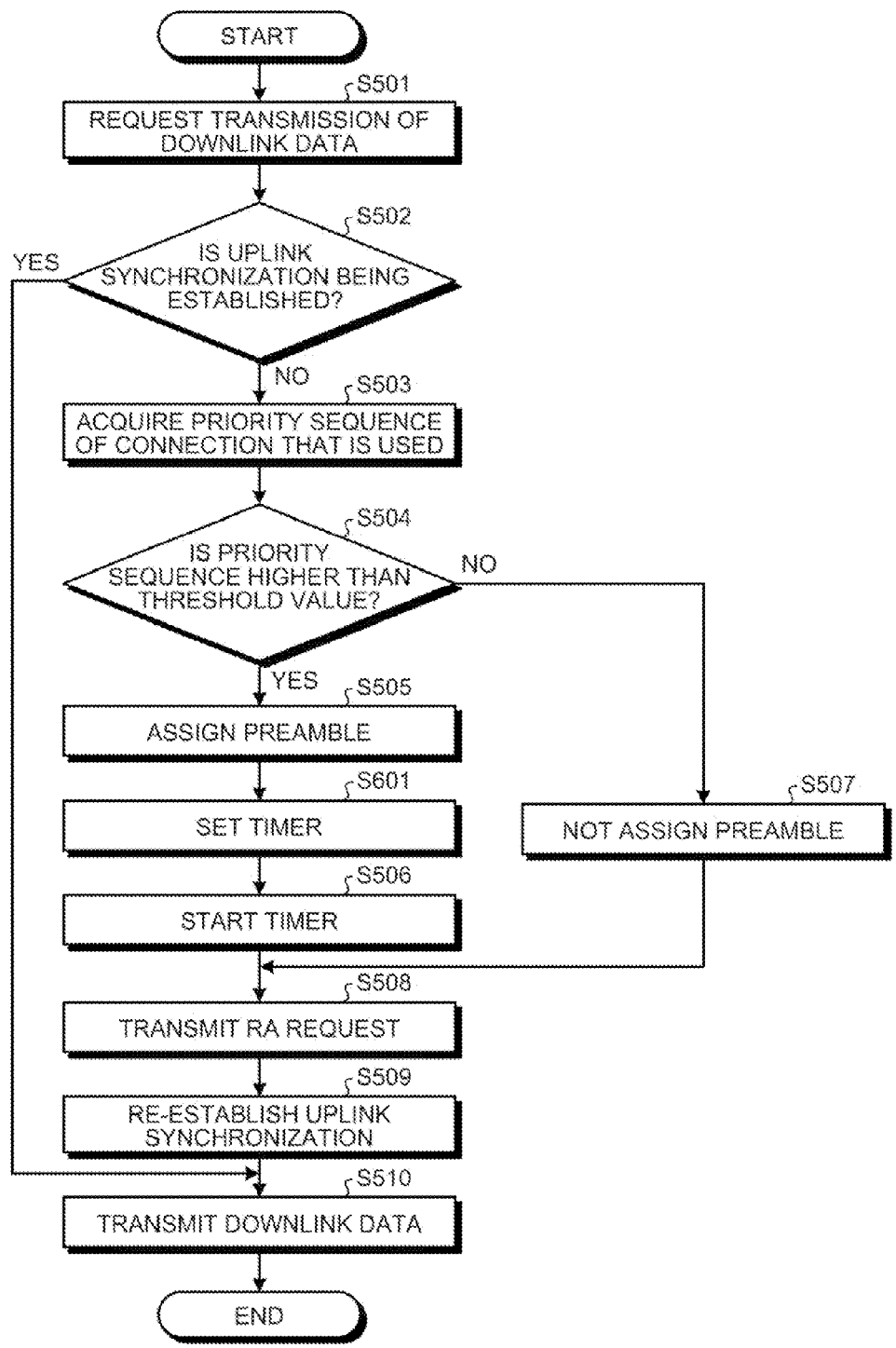
FIG. 16 is a flowchart illustrating an operation of the base station apparatus according to the sixth embodiment.

Now, it will be explained about an operation of the base station apparatus 100 constituted as described above with reference to a flowchart illustrated in FIG. 16. The same parts of FIG. 16 as those of FIG. 14 have the same reference numbers and their detailed descriptions are omitted.

When the transmission of downlink data to the terminal device 200 is requested (Step S501), the out-of-synchronism determining unit 402 determines whether the synchronization of the uplink from the terminal device 200 to the base station apparatus 100 is being established (Step S502). When the synchronization of the uplink is being established as the result of the determination (Step S502: Yes), the downlink data is immediately transmitted from the downlink data transmitting unit 409 to the terminal device 200 via the wireless communication unit 410 (Step S510).

On the other hand, when the out of synchronism of the uplink occurs (Step S502: No), the downlink data transmitting unit 409 stops transmitting the downlink data and waits to again establish the synchronization of the uplink. Then, the priority sequence acquiring unit 404 acquires a priority sequence corresponding to QCI of the connection that is actually used by the terminal device 200 from the terminal information storage unit 403 (Step S503).

Then, the threshold value comparing unit 405 determines whether the priority sequence acquired by the priority sequence acquiring unit 404 is higher than a predetermined order (Step S504). As a result of the determination, when it is determined that the priority sequence is lower than the predetermined order (in other words, the value of the priority sequence is not less than the predetermined threshold value) and the priority of the terminal device 200 is low (Step S504: No), it is determined that a preamble is not assigned to the terminal device 200 (Step S507).

On the other hand, when it is determined that the priority sequence is higher than the predetermined order (in other words, the value of the priority sequence is less than the predetermined threshold value) and the priority of the terminal device 200 is high (Step S504: Yes), it is determined that a preamble is assigned to the terminal device 200 (Step S505). Then, the RA request generating unit 407 refers to the assignment situation of preambles managed by the preamble managing unit 406 and assigns a not-assigned preamble to the terminal device 200. As a result, the preamble managing unit 406 stores the effect that the preamble assigned to the terminal device 200 is an already-assigned preamble.

Moreover, the adaptive timer unit 501 sets the expiration time of the timer corresponding to the preamble assigned to the terminal device 200 (Step S601). Specifically, a time assured by the preamble assigned to the terminal device 200 becomes longer as the priority sequence used for the priority determination of the terminal device 200 in the threshold value comparing unit 405 is higher. In other words, if the priority of the terminal device 200 is comparatively high, the adaptive timer unit 501 sets an expiration time in such a manner that the expiration time of the timer corresponding to the preamble assigned to the terminal device 200 becomes long. Similarly, if the priority of the terminal device 200 is comparatively low even if a preamble is assigned, the adaptive timer unit 501 sets an expiration time in such a manner that the expiration time of the timer corresponding to the preamble assigned to the terminal device 200 is short.

As a result, although times assured by preambles are different depending on the priority of the terminal device 200, the terminal device 200 having a comparatively high priority sequence can surely use the assigned preamble. Moreover, a preamble assigned to the terminal device 200 having a comparatively low priority sequence is not unnecessarily occupied for a long time and thus the shortage of a preamble can be effectively suppressed.

When the expiration time of a timer is set by the adaptive timer unit 501, the timer is started at the same time as the setting (Step S506). Then, the RA request generating unit 407 generates an RA request by which the assigned preamble is reported. The RA request generated by the RA request generating unit 407 is transmitted to the terminal device 200 via the downlink data transmitting unit 409 and the wireless communication unit 410 (Step S508). The transmitted RA request is received by the terminal device 200, and the terminal device 200 performs a non-contention based random access or a contention based random access in accordance with the RA request. Then, the RA processing unit 411 again establishes the synchronization of an uplink by using a random access process (Step S509). When the synchronization of the uplink is again established, that effect is reported from the RA processing unit 411 to the downlink data transmitting unit 409, and the downlink data transmitting unit 409 resumes the transmission of downlink data to transmit the downlink data from the wireless communication unit 410 (Step S510).

Moreover, when the timer of the adaptive timer unit 501 expires as a preamble transmitted from the terminal device 200 is not received, the preamble corresponding to the timer is released. As described above, in the present embodiment, times for releasing preambles are different depending on the priority of the terminal device 200.

As described above, according to the present embodiment, the base station apparatus determines the priority of a terminal device in accordance with the priority sequence of a connection that is used for the transmission of downlink data and assigns a preamble when the priority sequence is higher than a predetermined order. Then, the base station apparatus sets the expiration time of a timer that clocks a time assured by the preamble in accordance with the priority sequence of the terminal device. For this reason, although times assured by preambles are different depending on the priority of a terminal device, a terminal device having a comparatively high priority can surely use the assigned preamble. Moreover, a preamble assigned to a terminal device having a comparatively low priority is not unnecessarily occupied for a long time and thus the shortage of a preamble can be effectively suppressed.

[g] Seventh Embodiment

According to the seventh embodiment, it is determined whether the assignment of a preamble is restricted in accordance with a throughput of a process performed by a base station apparatus by using a non-contention based random access.

Although a network configuration according to the present embodiment is similar to the network configuration of the second embodiment illustrated in FIG. 2, the present embodiment explains a random access between the base station apparatus 100 and the terminal device 200 similarly to the fifth embodiment. Specifically, it will be explained about a random access when the out of synchronism of an uplink used for a retransmission request occurs when there is data that should be transmitted from the base station apparatus 100 to the terminal device 200 by using a downlink.

Figure 17:
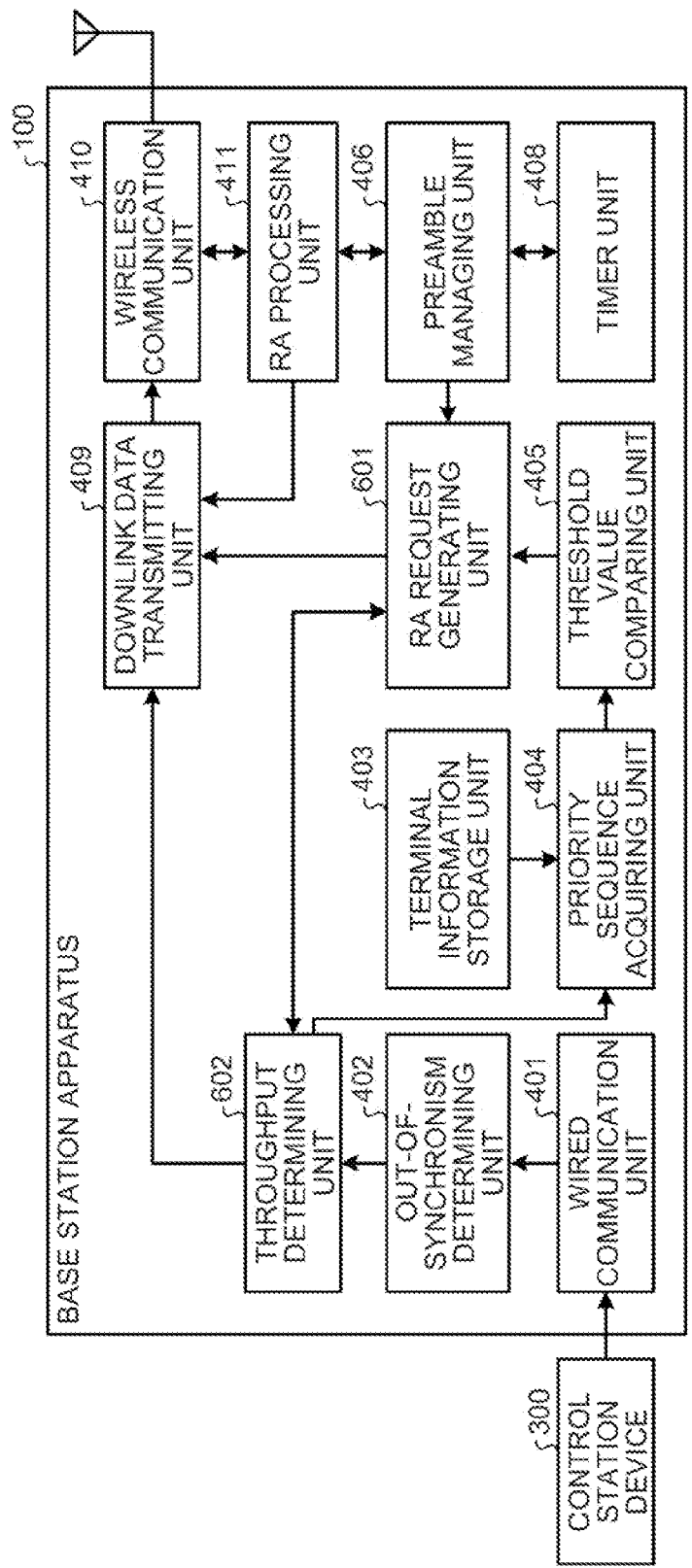
FIG. 17 is a block diagram illustrating the configuration of a base station apparatus according to a seventh embodiment.

FIG. 17 is a block diagram illustrating the configuration of the base station apparatus 100 according to the seventh embodiment. The same parts of FIG. 17 as those of FIG. 12 have the same reference numbers and their descriptions are omitted. The base station apparatus 100 illustrated in FIG. 17 includes an RA request generating unit 601 instead of the RA request generating unit 407 illustrated in FIG. 12 and further includes a throughput determining unit 602.

When it is determined that a preamble is assigned to the terminal device 200 as the result of the comparison performed by the threshold value comparing unit 405, the RA request generating unit 601 refers to the assignment situation of the preamble managing unit 406 and assigns a not-assigned preamble to the terminal device 200. Then, the RA request generating unit 601 generates an RA request that includes the preamble to be assigned to the terminal device 200. On the other hand, when it is determined that a preamble is not assigned to the terminal device 200 as the result of the comparison performed by the threshold value comparing unit 405, the RA request generating unit 601 generates an RA request indicating that a preamble is not assigned to the terminal device 200.

Furthermore, the RA request generating unit 601 reports a throughput of a process for assigning a preamble to the terminal device to the throughput determining unit 602. The throughput reported by the RA request generating unit 601 increases if the number of terminal devices to which preambles are assigned increases. In other words, the throughput of the RA request generating unit 601 increases when the number of terminal devices that perform a non-contention based random access increases. Therefore, the RA request generating unit 601 reports a throughput according to a non-contention based random access to the throughput determining unit 602.

When the out-of-synchronism determining unit 402 determines that the out of synchronism of the uplink occurs, the throughput determining unit 602 compares the throughput reported from the RA request generating unit 601 with a predetermined threshold value and determines whether the throughput is not less than the predetermined threshold value. Then, when the throughput is less than the predetermined threshold value, the throughput determining unit 602 outputs the downlink data to the downlink data transmitting unit 409 and instructs the RA request generating unit 601 to assign a preamble to the terminal device 200 that is the transmission destination of downlink data. In other words, when the throughput is less than the predetermined threshold value, the throughput determining unit 602 unconditionally assigns a preamble to the terminal device 200.

Moreover, when the throughput is not less than the predetermined threshold value, the throughput determining unit 602 outputs the downlink data to the downlink data transmitting unit 409 and instructs the priority sequence acquiring unit 404 to acquire a priority sequence of a connection used for the transmission of the downlink data. In other words, when the throughput is not less than the predetermined threshold value, the throughput determining unit 602 decides whether or not a preamble is assigned in accordance with the priority of the terminal device 200.

Figure 18:
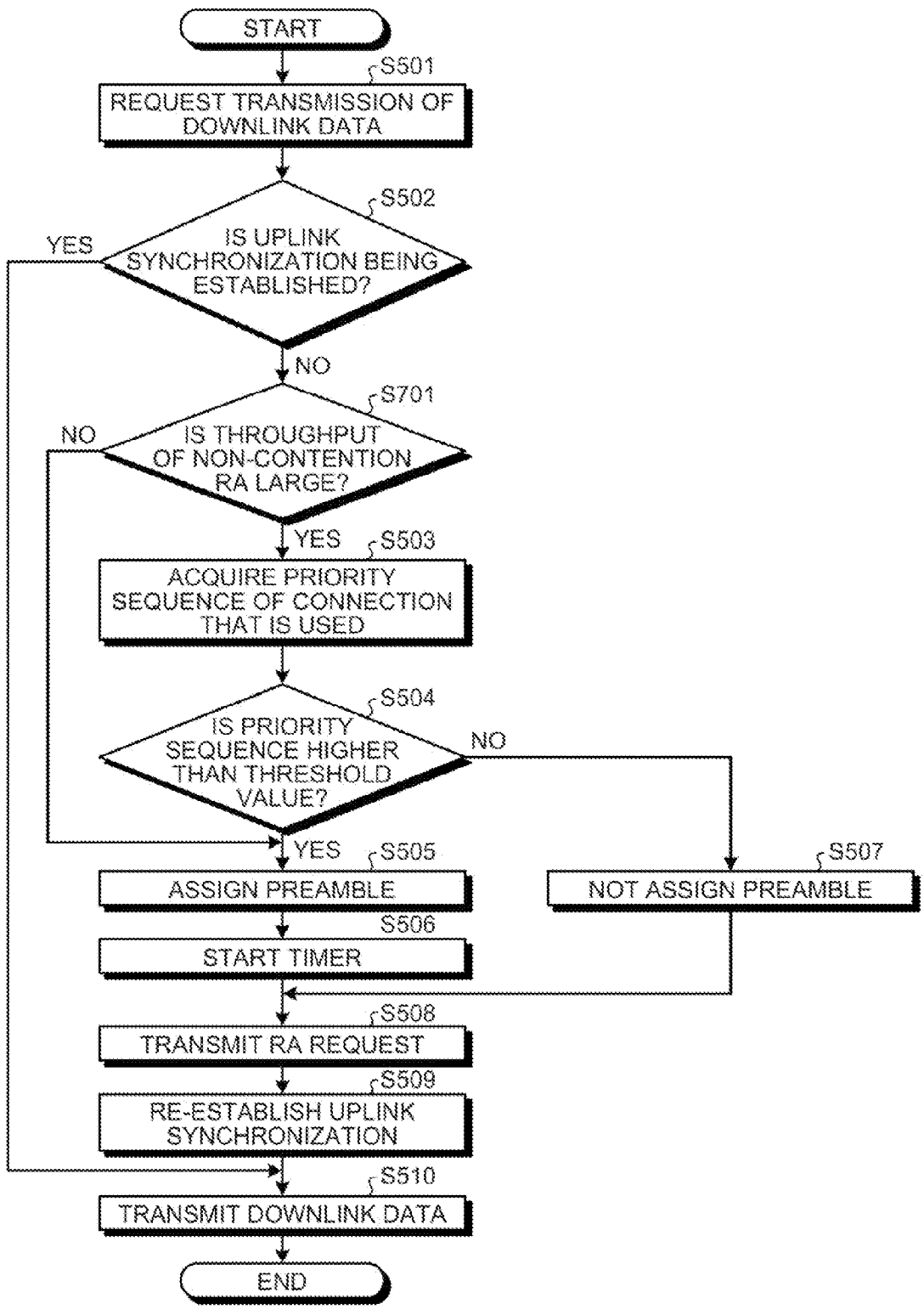
FIG. 18 is a flowchart illustrating an operation of the base station apparatus according to the seventh embodiment.

Now, it will be explained about an operation of the base station apparatus 100 constituted as described above with reference to a flowchart illustrated in FIG. 18. The same parts of FIG. 18 as those of FIG. 14 have the same reference numbers and their detailed descriptions are omitted.

When the transmission of downlink data to the terminal device 200 is requested (Step S501), the out-of-synchronism determining unit 402 determines whether the synchronization of an uplink from the terminal device 200 the base station apparatus 100 is being established (Step S502). When the synchronization of the uplink is being established as the result of the determination (Step S502: Yes), the downlink data is immediately transmitted from the downlink data transmitting unit 409 to the terminal device 200 via the wireless communication unit 410 (Step S510).

On the other hand, when the out of synchronism of the uplink occurs (Step S502: No), the downlink data transmitting unit 409 stops transmitting the downlink data and waits to again establish the synchronization of the uplink. The throughput determining unit 602 determines whether a throughput according to a non-contention based random access process is not less than a predetermined threshold value (Step S701). In other words, the throughput determining unit 602 compares the throughput reported from the RA request generating unit 601 with the predetermined threshold value.

When the throughput according to the non-contention based random access process is less than the predetermined threshold value as the result of the determination (Step S701: No), it is determined that a preamble is unconditionally assigned to the terminal device 200 (Step S505). In other words, according to the present embodiment, preambles are assigned all terminal devices while the throughput according to the non-contention based random access is small. Similarly to the fifth embodiment, a preamble is assigned to the terminal device 200 by the RA request generating unit 601, a timer is started, and an RA request is generated and transmitted from the wireless communication unit 410 (Step S506, S508). Then, the terminal device 200 executes a non-contention based random access by using the assigned preamble to again establish the synchronization of the uplink and transmit the downlink data to the terminal device 200 (Steps S509 and S510).

On the contrary, when the throughput according to the non-contention based random access process is not less than the predetermined threshold value (Step S701: Yes), the priority sequence acquiring unit 404 acquires a priority sequence of the connection used for the transmission of downlink data (Step S503). Similarly to the fifth embodiment, the threshold value comparing unit 405 compares the priority sequence of the terminal device 200 with a predetermined order and determines whether a preamble is assigned (Steps S504 to S507). In other words, according to the present embodiment, it is determined whether a preamble is assigned in accordance with the priority of the terminal device 200 if the throughput according to the non-contention based random access becomes large. Then, an RA request is generated by the RA request generating unit 601 in accordance with the presence or absence of the assignment of the decided preamble and is transmitted from the wireless communication unit 410 (Step S508). After that, the terminal device 200 executes a non-contention based random access or a contention based random access to again establish the synchronization of the uplink and transmit the downlink data to the terminal device 200 (Steps S509 and S510).

As described above, according to the present embodiment, the base station apparatus unconditionally assigns a preamble to a terminal device if a throughput according to a non-contention based random access is small and decides whether a preamble is assigned in accordance with the priority of a terminal device if the throughput is large. For this reason, for example, when the number of terminal devices that wirelessly communicate with a base station apparatus is small, the base station apparatus can assign preambles to all the terminal devices and execute a non-contention based random access by which the delay of communication does not occur. For example, when the number of terminal devices that wirelessly communicate with a base station apparatus is many, QoS required for a terminal device having a high priority can be surely achieved by performing a control according to the priority of the terminal device.

[h] Eighth Embodiment

According to the eighth embodiment, a condition on a priority for assigning a preamble is changed on the basis of a preamble utilization ratio indicating a ratio of already-assigned preambles to all preambles.

Although a network configuration according to the present embodiment is similar to the network configuration of the second embodiment illustrated in FIG. 2, the present embodiment explains a random access between the base station apparatus 100 and the terminal device 200 similarly to the fifth embodiment. Specifically, it will be explained about a random access when the out of synchronism of an uplink used for a retransmission request or the like occurs when there is data that should be transmitted from the base station apparatus 100 to the terminal device 200 by using a downlink.

Figure 19:
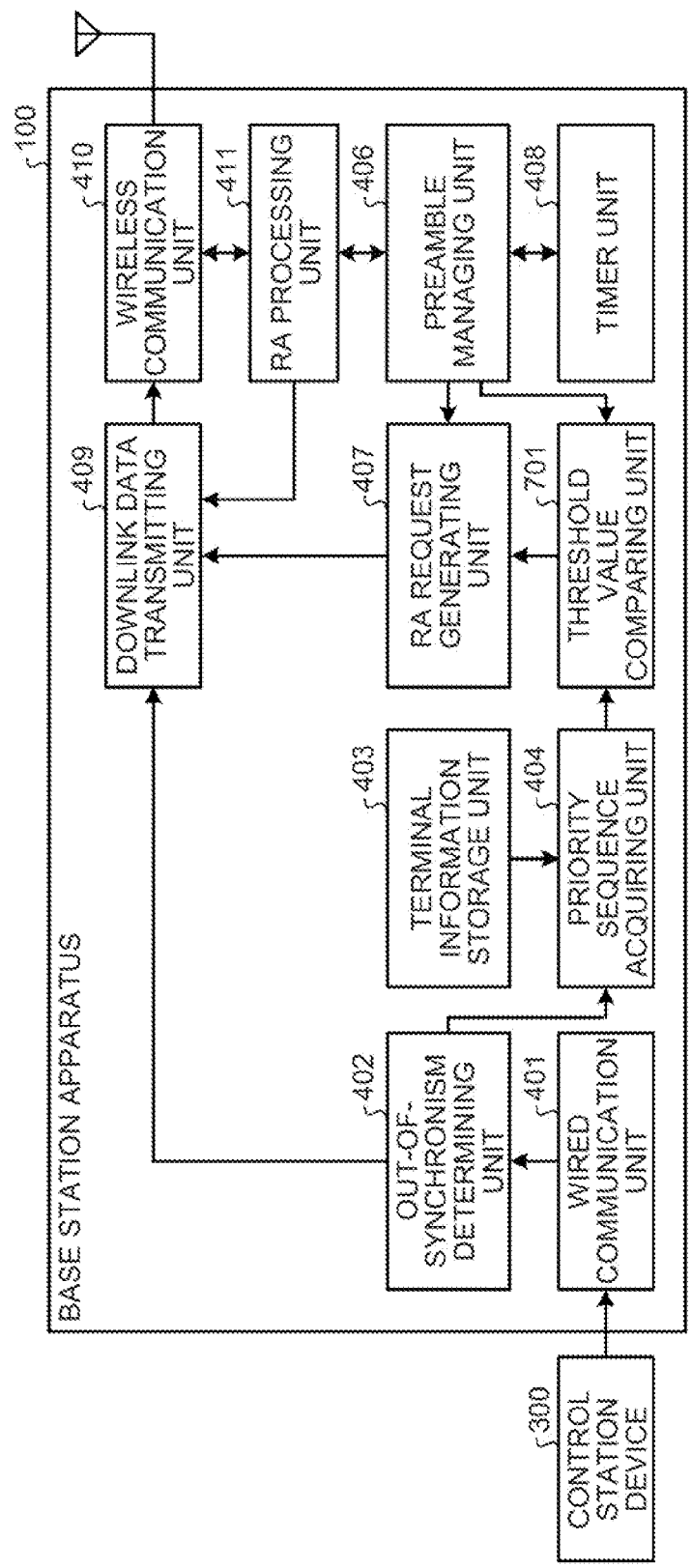
FIG. 19 is a block diagram illustrating the configuration of a base station apparatus according to an eighth embodiment.

FIG. 19 is a block diagram illustrating the configuration of the base station apparatus 100 according to the eighth embodiment. The same parts of FIG. 19 as those of FIG. 12 have the same reference numbers and their descriptions are omitted. The base station apparatus 100 illustrated in FIG. 19 includes a threshold value comparing unit 701 instead of the threshold value comparing unit 405 illustrated in FIG. 12.

The threshold value comparing unit 701 compares the priority sequence acquired by the priority sequence acquiring unit 404 and a predetermined threshold value. In this case, the threshold value comparing unit 701 adjusts the threshold value to be compared with the priority sequence on the basis of a utilization ratio of preambles that are managed by the preamble managing unit 406. Specifically, when the utilization ratio of preambles is less than a predetermined lower-limit threshold value, the threshold value comparing unit 701 relaxes an assignment condition of a preamble. In other words, the threshold value comparing unit 701 enlarges the predetermined threshold value to be compared with the value of a priority sequence required for the assignment of a preamble in such a manner that the priority sequence is lowered.

On the other hand, when the utilization ratio of preambles is not less than a predetermined upper-limit threshold value, the threshold value comparing unit 701 tightens the assignment condition of a preamble. In other words, the threshold value comparing unit 701 lessens the predetermined threshold value to be compared with the value of a priority sequence required for the assignment of a preamble in such a manner that the priority sequence is heightened.

Then, when the priority sequence is higher than a predetermined order and the value of the priority sequence is less than the predetermined threshold value, the threshold value comparing unit 701 determines that a preamble is assigned to the terminal device 200. On the other hand, when the priority sequence is lower than the predetermined order and the value of the priority sequence is not less than the predetermined threshold value, the threshold value comparing unit 701 determines that a preamble is not assigned to the terminal device 200.

Figure 20:
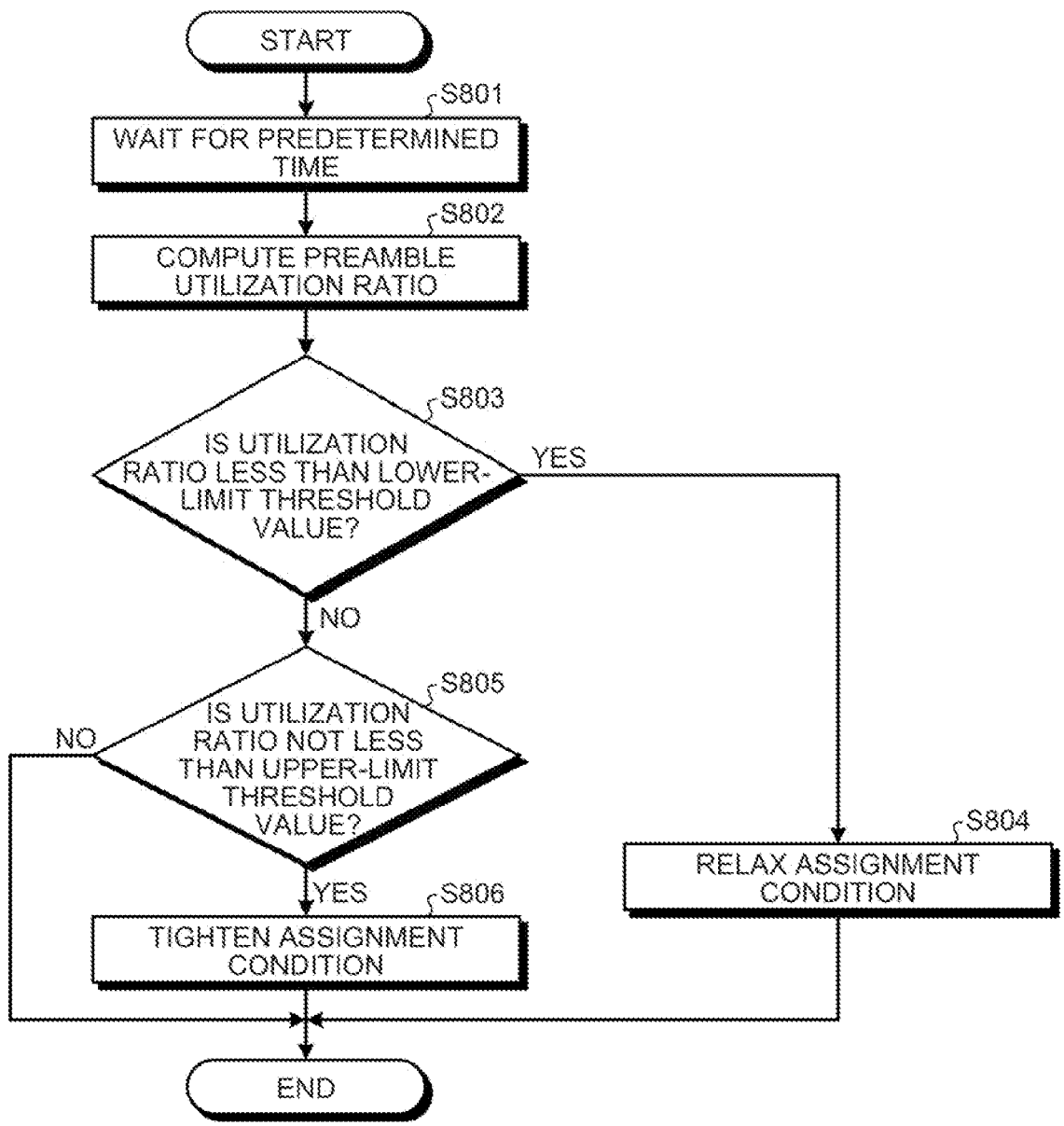
FIG. 20 is a flowchart illustrating a threshold value modification process according to the eighth embodiment.

Because the operation of the base station apparatus 100 having the configuration is similar to the operation of the fifth embodiment illustrated in FIG. 14, their descriptions are omitted. However, according to the present embodiment, a threshold value to be compared with a priority sequence used for the determination of the priority of the terminal device 200 is adjusted by the threshold value comparing unit 701. Therefore, it will be explained about a threshold value modification process according to the present embodiment with reference to a flowchart illustrated in FIG. 20. The following threshold value modification process is executed by the threshold value comparing unit 701 in parallel with the comparison process between a priority sequence and a threshold value.

When the modification of a threshold value is executed by the threshold value comparing unit 701, the threshold value modification process is waited without modifying the threshold value for a predetermined time after the execution (Step S801). This reason is that the further modification of the threshold value is not permitted while a preamble utilization ratio can be varied due to the influence of the previous threshold value modification. As a result, the next threshold value modification is not performed in accordance with a preamble utilization ratio just after the modification of a threshold value but the next threshold value modification can be performed after a preamble utilization ratio becomes a steady state.

When the predetermined time passes from the previous threshold value modification process, the threshold value comparing unit 701 refers to the assignment situation of preambles managed by the preamble managing unit 406 and computes a preamble utilization ratio (Step S802). Specifically, the threshold value comparing unit 701 computes a ratio of the number of preambles already assigned to the terminal device to the number of all preambles that can be used by the base station apparatus 100 by using a non-contention based random access. In other words, a ratio of the number of preambles stored as an already-assigned preamble to the number of non-contention preambles that are managed by the preamble managing unit 406 is computed as a preamble utilization ratio.

Then, the threshold value comparing unit 701 determines whether the preamble utilization ratio is less than a predetermined lower-limit threshold value (Step S803). The lower-limit threshold value is a value that indicates the lower limit of an appropriate range of the preamble utilization ratio. When the preamble utilization ratio is less than the lower-limit threshold value, it is expected that the assignment of a preamble is strictly restricted beyond necessity. Therefore, when the preamble utilization ratio is less than the predetermined lower-limit threshold value (Step S803: Yes), the assignment condition required for the assignment of a preamble is relaxed (Step S804). Specifically, a threshold value to be compared with a priority sequence is modified by the threshold value comparing unit 701 and thus a preamble is also assigned to a terminal device having a lower priority sequence than the present one. In other words, when a threshold value to be compared with the value of a priority sequence becomes larger than the present one and when a preamble is assigned to, for example, only the terminal device of which the value of a priority sequence is "1" or "2", a preamble will be also assigned to the terminal device of which the value of a priority sequence is "3".

On the other hand, when the preamble utilization ratio is not less than the predetermined lower-limit threshold value (Step S803: No), it is continuously determined whether the preamble utilization ratio is not less than a predetermined upper-limit threshold value (Step S805). The upper-limit threshold value is a value that indicates the upper limit of an appropriate range of the preamble utilization ratio. When the preamble utilization ratio is not less than the upper-limit threshold value, it is expected that the restriction of the assignment of a preamble is too relaxed. Therefore, when the preamble utilization ratio is not less than the predetermined upper-limit threshold value (Step S805: Yes), the assignment condition required for the assignment of a preamble is tightened (Step S806). Specifically, a threshold value to be compared with a priority sequence is modified by the threshold value comparing unit 701 and thus a preamble is assigned to only the terminal device that has a priority sequence higher than the present one. In other words, when a threshold value to be compared with the value of a priority sequence becomes smaller than the present one and when a preamble is assigned to, for example, only the terminal device of which the value of a priority sequence is "1" or "2", a preamble will be assigned to only the terminal device of which the value of a priority sequence is "1".

In this way, the assignment condition required for the assignment of a preamble is changed by adjusting the threshold value to be compared with the priority sequence in the threshold value comparing unit 701, and thus a preamble utilization ratio is varied. As a result, a preamble utilization ratio falls within an appropriate range and thus the shortage or waste of a preamble can be suppressed.

As described above, according to the present embodiment, the base station apparatus performs the assignment of a preamble in accordance with the priority of a terminal device while adjusting a condition required for the assignment of a preamble in accordance with a preamble utilization ratio. For this reason, the utilization ratio of a preamble is always retained within an appropriate range and thus the generation of the shortage and waste of a preamble can be prevented.

Moreover, in the above embodiments, it has been explained about the case where the priority of a terminal device is determined by using a priority sequence, an allowable delay, an allowable loss ratio, or a resource type corresponding to QCI. However, the priority of a terminal device may be determined by other terminal information. In other words, for example, when an absolute priority that is unrelated to a communication state and communication data is set for each terminal device, the presence or absence of the assignment of a preamble may be determined by the absolute priority. In this case, it is expected that an absolute priority for each terminal device is used as terminal information. Furthermore, the priority of a terminal device can be compositely computed, for example, by adding information such as a priority sequence corresponding to QCI to the priority of the terminal device.

Moreover, the sixth to eighth embodiments can be realized by appropriately combining the embodiments with the second to fourth embodiments. In other words, the expiration time of a timer may be adaptively set in the case of a random access of a handover or whether the assignment of a preamble is restricted may be decided by using a throughput of a process according to a non-contention based random access. Similarly, when an allowable delay or the like corresponding to QCI is used as terminal information, the expiration time of a timer may be adaptively set or whether the assignment of a preamble is restricted may be decided by using a throughput of a process according to a non-contention based random access.

Moreover, a program in which the preamble assignment process explained in the above embodiments is described with a language that can be executed by a computer can be also created. In this case, the same effects as those of the above embodiments can be obtained by executing the program by a computer included in a base station apparatus. Furthermore, the same preamble assignment process as that of the above embodiments may be realized by recording the program in a computer-readable recording medium and making a computer read the program recorded in the recording medium to execute the program.

Figure 21:
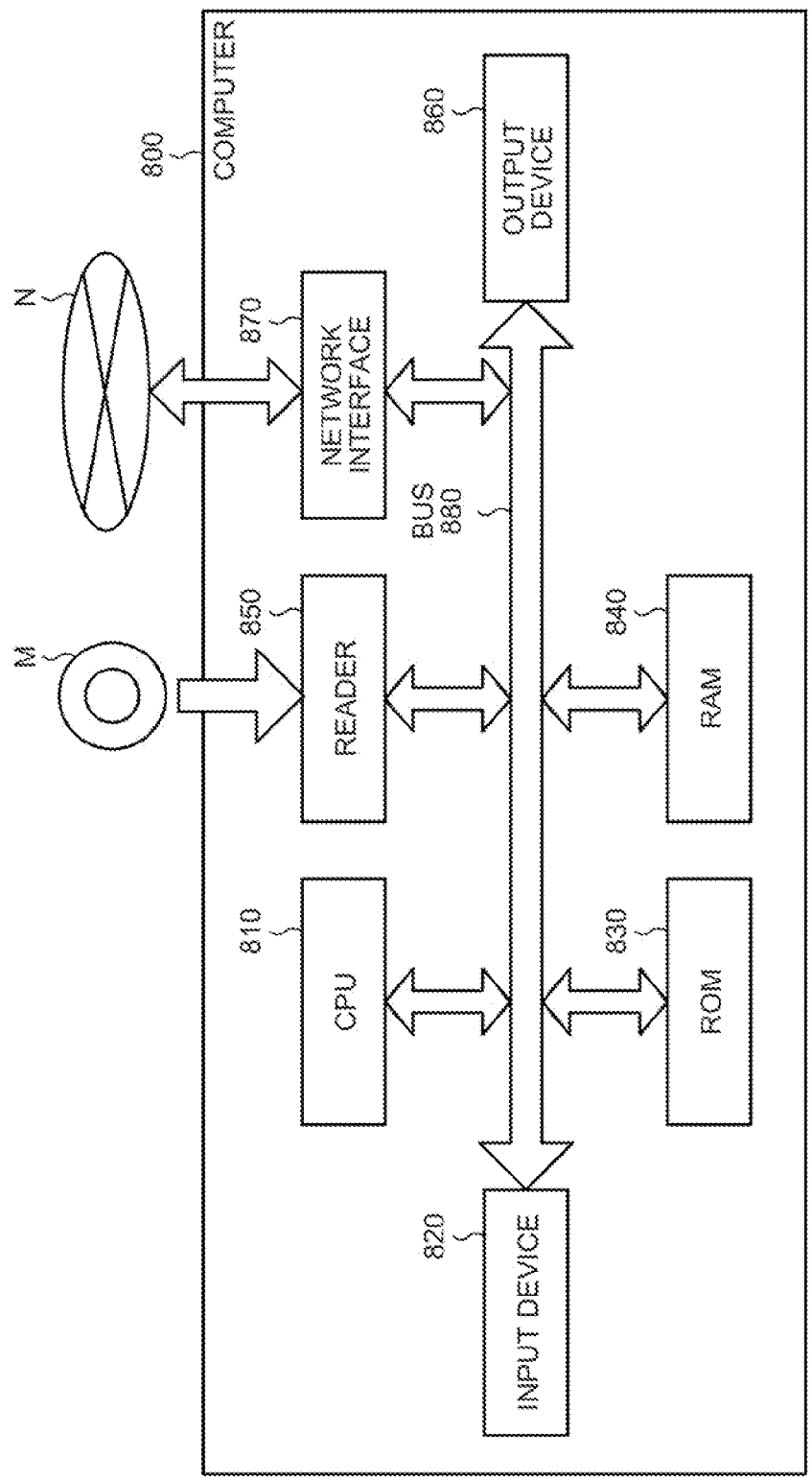
FIG. 21 is a diagram illustrating a hardware configuration example of a computer.
Figure 22:
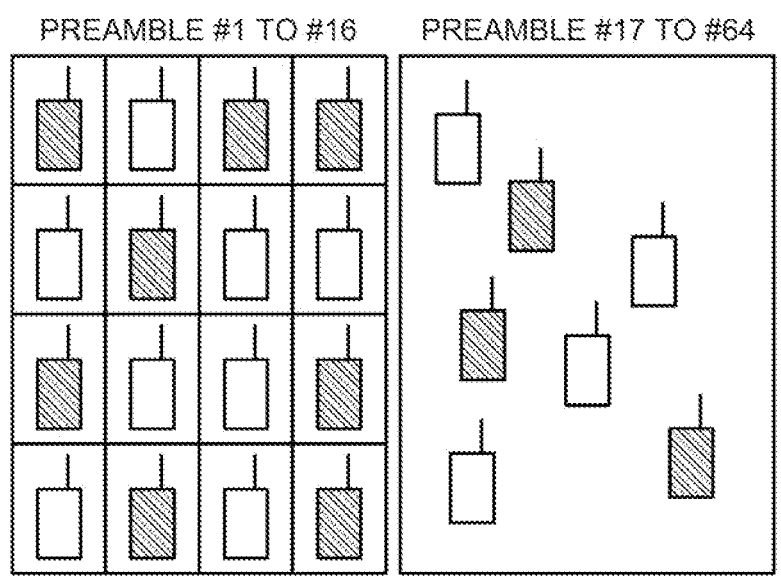
FIG. 22 is a diagram illustrating a specific example of a preamble assignment.

FIG. 21 is a block diagram illustrating the hardware configuration of a computer 800 that performs a preamble assignment process. As illustrated in FIG. 21, the computer 800 includes a CPU 810 that executes the program, an input device 820 that inputs data, a ROM 830 that stores therein various types of data, a RAM 840 that stores therein an operation parameter and the like, a reader 850 that reads a program from a recording medium M that records a program for realizing the preamble assignment process, an output device 860 such as a display, and a network interface 870 that gives and receives data to and from another computer via a network N, which are connected by a bus 880.

The CPU 810 reads the program recorded in the recording medium M via the reader 850 and then executes the program to realize the preamble assignment process. Moreover, the recording medium M includes an optical disc, a flexible disk, a CD-ROM, a hard disk, and the like. Moreover, the program may be introduced into the computer 800 via the network N. At this time, the network N may be a wireless network or may be a wired network.

As described above, according to an aspect of the present invention, the delay of a communication start performed by a terminal device of which the bandwidth is assured can be prevented and a required QoS can be achieved.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A base station apparatus comprising:
   an acquiring unit that acquires terminal information indicating a priority of a terminal device for which synchronization is not established between the base station apparatus and the terminal device;
   a determining unit that determines whether the priority of the terminal device is not less than a predetermined reference on the basis of the terminal information acquired by the acquiring unit;
   an assigning unit that assigns an identifier used for synchronization establishment using a random access to a terminal device whose priority is determined to be not less than the predetermined reference, while does not assign an identifier to a terminal device whose priority is determined to be less than the predetermined reference;
   a transmitting unit that transmits assignment information including the identifier assigned by the assigning unit; and
   a throughput determining unit that determines whether a throughput of the assignment process of the identifier performed in the assigning unit is not less than a predetermined amount, wherein
   the assigning unit assigns an identifier to the terminal device independently of the priority of the terminal device when the throughput is less than the predetermined amount as a result of the determination of the throughput determining unit.

2. The base station apparatus according to claim 1, wherein the determining unit determines whether a highest priority among priorities of connections established by the terminal device that are included in the terminal information acquired by the acquiring unit is not less than the predetermined reference.

3. The base station apparatus according to claim 1, wherein the determining unit determines whether a priority of a connection used for data transmission among priorities of connections established by the terminal device that are included in the terminal information acquired by the acquiring unit is not less than the predetermined reference.

4. The base station apparatus according to claim 1, wherein the determining unit determines whether a priority sequence that is included in the terminal information acquired by the acquiring unit and corresponds to a communication quality index value given to a connection established by the terminal device is higher than a predetermined order.

5. The base station apparatus according to claim 1, wherein the determining unit determines whether an allowable delay that is included in the terminal information acquired by the acquiring unit and corresponds to a communication quality index value given to a connection established by the terminal device is smaller than a predetermined threshold value.

6. The base station apparatus according to claim 1, wherein the determining unit determines whether an allowable loss ratio that is included in the terminal information acquired by the acquiring unit and corresponds to a communication quality index value given to a connection established by the terminal device is smaller than a predetermined threshold value.

7. The base station apparatus according to claim 1, wherein the determining unit determines whether a resource type that is included in the terminal information acquired by the acquiring unit and corresponds to a communication quality index value given to a connection established by the terminal device is a resource type of which a bandwidth is assured.

8. The base station apparatus according to claim 1, further comprising:
    a timer unit that measures a lapse time after the identifier is assigned to the terminal device by the assigning unit and expires when the measured lapse time reaches an expiration time that is set; and
    a managing unit that releases the identifier assigned to the terminal device by the assigning unit to be a not-assigned identifier when the timer unit expires.

9. The base station apparatus according to claim 8, wherein the timer unit sets a different expiration time in accordance with the priority of the terminal device.

10. The base station apparatus according to claim 1, wherein the determining unit computes a preamble utilization ratio that indicates a ratio of a number of already-assigned preambles to a number of all preambles that can be used for a non-contention based random access and modifies a reference to be compared with the priority of the terminal device in accordance with the computed preamble utilization ratio.

11. The base station apparatus according to claim 10, wherein the determining unit relaxes a reference to be compared with the priority of the terminal device compared to a present reference when the preamble utilization ratio is less than a predetermined lower-limit threshold value.

12. The base station apparatus according to claim 10, wherein the determining unit tightens a reference to be compared with the priority of the terminal device compared to a present reference when the preamble utilization ratio is not less than a predetermined upper-limit threshold value.

13. An identifier assignment method implemented by a base station apparatus, the method comprising:
    acquiring terminal information indicating a priority of a terminal device for which synchronization is not established between the base station apparatus and the terminal device;
    determining, by the base station apparatus, whether the priority of the terminal device is not less than a predetermined reference based on the acquired terminal information;
    assigning, by the base station apparatus, an identifier used for synchronization establishment using a random access to a terminal device whose priority is determined to be not less than the predetermined reference, while not assigning an identifier to a terminal device whose priority is determined to be less than the predetermined reference; and
    transmitting, by the base station apparatus, assignment information including the identifier assigned at the assigning, wherein
    the assigning includes determining whether a throughput of the assignment process of the identifier is not less than a predetermined amount, and assigning an identifier to the terminal device independently of the priority of the terminal device when the throughput is less than the predetermined amount as a result of the determination.

14. A computer-readable, non-transitory medium storing an identifier assignment program causing a base station apparatus to execute a process comprising:
    acquiring terminal information indicating a priority of a terminal device for which synchronization is not established between the base station apparatus and the terminal device;
    determining, by the base station apparatus, whether the priority of the terminal device is not less than a predetermined reference based on the acquired terminal information;
    assigning, by the base station apparatus, an identifier used for synchronization establishment using a random access to a terminal device whose priority is determined to be not less than the predetermined reference, while not assigning an identifier to a terminal device whose priority is determined to be less than the predetermined reference; and
    transmitting, by the base station apparatus, assignment information including the identifier assigned at the assigning, wherein
    the assigning includes determining whether a throughput of the assignment process of the identifier is not less than a predetermined amount, and assigning an identifier to the terminal device independently of the priority of the terminal device when the throughput is less than the predetermined amount as a result of the determination.

* * * * *